US012598026B2

(12) United States Patent (10) Patent No.: US 12,598,026 B2
Peng et al. (45) Date of Patent: Apr. 7, 2026

(54) SENSING METHOD AND COMMUNICATION APPARATUS

(71) Applicant: HUAWEI TECHNOLOGIES CO., LTD., Shenzhen (CN)

(72) Inventors: Xiaohui Peng, Shenzhen (CN); Jiajin Luo, Shenzhen (CN); Rui Du, Shenzhen (CN); Baojian Zhou, Shenzhen (CN); Min Yan, Shenzhen (CN); Yan Chen, Ottawa (CA); Yinghao Guo, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 382 days.

(21) Appl. No.: 18/472,757

(22) Filed: Sep. 22, 2023

(65) Prior Publication Data

US 2024/0014936 A1     Jan. 11, 2024

Related U.S. Application Data

(63) Continuation of application No. PCT/CN2021/142163, filed on Dec. 28, 2021.

(30) Foreign Application Priority Data

Mar. 25, 2021     (CN) .......................... 202110320379.4

(51) Int. Cl.
  H04W 24/08     (2009.01)
  H04L 1/08      (2006.01)
  (Continued)
(52) U.S. Cl.
  CPC .............. H04L 1/08 (2013.01); H04L 5/0053 (2013.01)

(58) Field of Classification Search
  CPC ... H04L 1/08; H04L 5/0053; H04L 27/26132; H04W 24/08
  See application file for complete search history.

(56) References Cited

U.S. PATENT DOCUMENTS

2021/0286045 A1*  9/2021  Bayesteh ............. H04B 7/0695
2022/0196709 A1*  6/2022  Winer .................... G01R 31/40

FOREIGN PATENT DOCUMENTS

CN      112350809 A      2/2021
CN      112398601 A      2/2021
       (Continued)

OTHER PUBLICATIONS

3GPP TSG-RAN4 Meeting#82, R4-1701540 Title:Correction of RMC reference in th ecat-0 HD-FDD intra-frequency event-triggered reporting ubnder fading propogation in asynchronous cells test (Year: 2017).*

(Continued)

*Primary Examiner* — Christopher M Crutchfield
*Assistant Examiner* — Abusayeed M Haque
(74) *Attorney, Agent, or Firm* — HAUPTMAN HAM, LLP

(57)     ABSTRACT

A sensing method includes determining, by a first communication apparatus, first information. The first information indicates a pulse repetition interval (PRI). The sensing method also includes sending, by the first communication apparatus, the first information to a second communication apparatus. The first information is used by the second communication apparatus to send a reference signal, and a periodicity of the reference signal in time domain is less than or equal to the PRI. The sensing method further includes receiving, by the first communication apparatus, the reference signal from the second communication apparatus. The sending method additionally includes sensing, by the first (Continued)

communication apparatus, a to-be-sensed target based on the reference signal.

20 Claims, 9 Drawing Sheets

(51) Int. Cl.
 H04L 5/00     (2006.01)
 H04L 25/02    (2006.01)

(56)      References Cited

FOREIGN PATENT DOCUMENTS

| | | |
|----|----------------|--------|
| CN | 112436905 A | 3/2021 |
| WO | 2021030685 A1 | 2/2021 |

OTHER PUBLICATIONS

3GPP TSG-RAN WG1 Meeting#85, R1-164928 Title: Discussion on schediling combination for eLAA (Year: 2016).*
Office Action issued in EP21932790 Dated Oct. 7, 2025.
Extended European Search Report issued in corresponding European Application No. 21932790.5, dated Jul. 1, 2024, pp. 1-7.
Wu Ke et al, "Joint wireless communication and radar sensing systems—state of the art and future prospects",2012, total 11 pages.
Ruben Morales Ferre et al,"Positioning Reference Signal design for positioning via 5G",2019,total 4 pages.
Damodaran, Neena et al,"Device free human activity and fall recognition using WiFi channel state information (CSI)",2020,total 17 pages.
International Search Report issued in corresponding International Application No. PCT/CN2021/142163, dated Feb. 28, 2022, pp. 1-10.

* cited by examiner

Uplink reference signal

Uncrewed
aerial
vehicle

Network device 1

Network device 2

First
information

First
information

Reference signal

Terminal device 1                    Terminal device 2

(a)            (b)

(c)            (d)

SENSING METHOD AND COMMUNICATION APPARATUS

CROSS-REFERENCE TO RELATED APPLICATIONS

This application is a continuation of International Application No. PCT/CN2021/142163, filed on Dec. 28, 2021, which claims priority to Chinese Patent Application No. 202110320379.4, filed on Mar. 25, 2021. The disclosures of the aforementioned applications are hereby incorporated by reference in their entireties.

TECHNICAL FIELD

Embodiments of this application relate to the field of communication technologies, and in particular, to a sensing method and a communication apparatus.

BACKGROUND

In a wireless sensing technology, changes of radio signals are analyzed in a propagation process to obtain a characteristic of signal propagation space and sense a scenario. The signal propagation space may be considered as a channel. The scenario herein includes human factors, such as whether there is a person and a location, a posture, or an action of the person, and also includes other external factors, such as a building and a moving vehicle. Radar is one of the most classic wireless sensing means, and is widely used in fields such as military affairs, agriculture, and meteorology. A basic principle of the radar is that a transmitter transmits a specific waveform signal, the specific waveform signal is received by a receiver through a wireless channel, and signal processing is performed with reference to a transmitted signal and a received signal, so that a target of interest is extracted from the wireless channel. A main function of a wireless communication system is to exchange information between transceivers. A basic principle of the wireless communication system is that a transmitter transmits a specific waveform signal, the specific waveform signal is received by a receiver through a wireless channel, and the signal transmitted by the transmitter is obtained through demodulation after signal processing. From a perspective of an entire physical process of sending, transmission, and receiving, the wireless sensing technology is very similar to a wireless communication process. Therefore, a wireless communication technology and the wireless sensing technology may be combined into one to sense a surrounding environment while communication is implemented.

From the perspective of the physical process, the channel is affected by the surrounding environment, and channel measurement may be considered as a sensing manner in a sense. How to perform sensing based on wireless communication to improve sensing performance is a problem that needs to be considered.

SUMMARY

Embodiments of this application provide a sensing method and a communication apparatus, to improve sensing performance.

According to a first aspect, a sensing method is provided. The method may be performed by two devices. The two devices may be denoted as a first communication apparatus and a second communication apparatus. From reference signal sending and receiving perspectives, the first communication apparatus may also be referred to as a receiving device, a receiving node, or a receiving end. The second communication apparatus may also be referred to as a sending device, a sending node, a transmitting node, or a transmitting end. The first communication apparatus and the second communication apparatus are used for description below. The method may be performed by the first communication apparatus and the second communication apparatus, or may be performed by components (such as processors, chips, or chip systems) in the first communication apparatus and the second communication apparatus. The method may be implemented by using the following steps: The first communication apparatus determines first information, where the first information indicates a pulse repetition interval PRI. The first communication apparatus sends the first information to the second communication apparatus. Correspondingly, the second communication apparatus receives the first information from the first communication apparatus. The first information is used by the second communication apparatus to send a reference signal, and a periodicity of the reference signal in time domain is less than or equal to the PRI. The second communication apparatus sends the reference signal to the first communication apparatus based on the first information. Correspondingly, the first communication apparatus receives the reference signal from the second communication apparatus. The first communication apparatus senses a to-be-sensed target based on the reference signal. The first information indicates the PRI, and the second communication apparatus may send the reference signal based on the PRI. The periodicity of the reference signal in time domain is limited to be less than or equal to the PRI. In this way, Doppler information obtained by processing the reference signal by the first communication apparatus is more accurate, and sensing performance is improved.

The following describes some possible designs of the first aspect.

In a possible design, the PRI is determined based on a maximum movement speed of the to-be-sensed target and a wavelength of the reference signal. Optionally, the maximum movement speed of the to-be-sensed target may be preset.

In a possible design, the PRI conforms to the following relational expression: the PRI is less than or equal to $\lambda/V_{max}$, where $\lambda$ is the wavelength of the reference signal, and $V_{max}$ is the maximum movement speed of the to-be-sensed target. After receiving the first information, the second communication apparatus determines the PRI based on the first information, a value of the determined PRI may be considered as a PRI reference value or a PRI threshold, and the value of the PRI can ensure that a Doppler change range generated based on the maximum movement speed of the to-be-sensed target does not exceed a maximum measurable Doppler range determined based on a length of the PRI. When the periodicity of the reference signal in time domain is less than or equal to the PRI, a maximum measurable Doppler range determined based on the periodicity of the reference signal in time domain is greater than or equal to the maximum measurable Doppler range determined based on the length of the PRI. Therefore, the periodicity of the reference signal in time domain can also meet that the Doppler change range generated based on the maximum movement speed of the to-be-sensed target does not exceed the maximum measurable Doppler range determined based on the periodicity of the reference signal in time domain. A speed measurement blur does not occur, and accuracy of speed measurement is improved, thereby helping improve sensing performance.

In a possible design, the first information further indicates a coherent processing interval CPI; and a length of the reference signal is greater than or equal to a length of the CPI. The first information indicates the CPI, and the second communication apparatus may send the reference signal based on the CPI. The length of the reference signal is limited to be greater than or equal to the length of the CPI. This helps ensure that there is sufficient accumulation time during processing of the reference signal, ensure a signal-to-noise ratio, and improve sensing performance. Sensing performance can be ensured only when the reference signal is used for sensing.

In a possible design, the CPI may be determined based on one or more of the following: a relative movement speed between the first communication apparatus and the to-be-sensed target, a range resolution unit, relative movement acceleration between the first communication apparatus and the to-be-sensed target, or a speed resolution unit. Optionally, the CPI is determined based on a first value and/or a second value. The first value is determined based on the range resolution unit and the relative movement speed between the first communication apparatus and the to-be-sensed target, and the second value is determined based on the speed resolution unit and the relative movement acceleration between the first communication apparatus and the to-be-sensed target. If a movement range of the to-be-sensed target exceeds one range resolution unit in duration of one CPI, a result of sensing obtained by processing a signal in the duration of the CPI is inaccurate. Determining the CPI based on the range resolution unit and the relative movement speed between the first communication apparatus and the to-be-sensed target can help implement effective signal accumulation. If a speed change of the to-be-sensed target exceeds one speed resolution unit in duration of one CPI, a result of sensing obtained by processing a signal in the duration of the CPI is inaccurate. Determining the CPI based on the speed resolution unit and the relative movement acceleration between the first communication apparatus and the to-be-sensed target can help implement effective signal accumulation.

In a possible design, the CPI is a smaller one of the first value and the second value. In this way, the CPI can be determined based on range resolution and speed resolution, and sensing performance can be further improved.

In a possible design, the CPI conforms to the following relational expression: the CPI is less than or equal to $\Delta R/v$, where $\Delta R$ is the range resolution unit, and $v$ is the relative movement speed between the first communication apparatus and the to-be-sensed target. For example, the foregoing first value may be $\Delta R/v$. Under the constraint of the relational expression, it can be ensured that the to-be-sensed target does not span one range resolution unit in the duration of one CPI, to ensure sensing performance.

In a possible design, $\Delta R=c/B$, where c is a speed of light, and B is a bandwidth of the reference signal.

In a possible design, the CPI conforms to the following relational expression: the CPI is less than or equal to $\Delta v/a$, where $\Delta v$ is the speed resolution unit, and a is the relative movement acceleration between the first communication apparatus and the to-be-sensed target. Under the constraint of the relational expression, it can be ensured that the speed change of the to-be-sensed target cannot exceed one speed resolution unit in the duration of one CPI, to ensure sensing performance.

In a possible design, $\Delta v=\lambda/CPI$, where $\lambda$ is the wavelength of the reference signal. For example, the second value may be $\sqrt{\lambda/a}$.

Optionally, a value of v and/or a value of a may be obtained in the following manner. The second communication apparatus sends the reference signal to the first communication apparatus. The length and a sending location of the reference signal may be determined in any manner, for example, a reference signal that is sent when there is data transmission and that is used to measure a channel condition. After receiving the reference signal, the first communication apparatus estimates the value of v and/or the value of a based on the reference signal. Alternatively, initial values of v and a may be obtained through measurement of a sensor of the to-be-sensed target.

In a possible design, in a scenario in which there is a control node, the first communication apparatus may forward the first information to the second communication apparatus through the control node. For example, the first communication apparatus sends the first information to the control node, so that the control node forwards the first information to the second communication apparatus.

In a possible design, the first communication apparatus may further send a result of sensing the to-be-sensed target to the second communication apparatus, and the second communication apparatus receives the result, and configures a density of the reference signal in time domain based on the result. Because movement of the to-be-sensed target causes a channel change, accuracy of performing channel estimation based on the reference signal is reduced, and an intensity of the channel change is related to a movement speed of the terminal device. A greater movement speed of the to-be-sensed target indicates an intenser channel change. The density of the reference signal in time domain is increased, so that accuracy of channel estimation can be improved, to improve demodulation performance of a receiver. The first communication apparatus senses the to-be-sensed target, obtains the result of sensing, and sends the result of sensing to the second communication apparatus. The second communication apparatus may determine the movement speed of the to-be-sensed target based on the result of sensing, and determine the density of the reference signal in time domain based on the movement speed of the to-be-sensed target.

According to a second aspect, a communication apparatus is provided. The communication apparatus may be a first communication apparatus, an apparatus (such as a chip, a chip system, or a circuit) in the first communication apparatus, or an apparatus that can be used with the first communication apparatus. In a design, the communication apparatus may include modules that are in a one-to-one correspondence with the method/operations/steps/actions performed by the first communication apparatus in the first aspect. The modules may be implemented by a hardware circuit, software, or a combination of a hardware circuit and software. In a design, the communication apparatus may include a processing module and a communication module. The processing module is configured to invoke the communication module to perform a receiving function and/or a sending function. For example, the processing module is configured to determine first information, where the first information indicates a pulse repetition interval PRI. The communication module is configured to send the first information to a second communication apparatus, where the first information is used by the second communication apparatus to send a reference signal, and a periodicity of the reference signal in time domain is less than or equal to the PRI. The communication module is further configured to receive the reference signal from the second communication apparatus. The processing module is further configured to sense a to-be-sensed target based on the reference signal.

In a possible design, in a scenario in which there is a control node, the communication module is further configured to send the first information to the control node, so that the control node forwards the first information to the second communication apparatus.

In a possible design, the communication module is further configured to send a result of sensing the to-be-sensed target to the second communication apparatus, where the result is used by the second communication apparatus to configure a density of the reference signal in time domain.

According to a third aspect, a communication apparatus is provided. The communication apparatus may be a second communication apparatus, an apparatus (such as a chip, a chip system, or a circuit) in the second communication apparatus, or an apparatus that can be used with the second communication apparatus. In a design, the communication apparatus may include modules that are in a one-to-one correspondence with the method/operations/steps/actions performed by the second communication apparatus in the first aspect. The modules may be implemented by a hardware circuit, software, or a combination of a hardware circuit and software. In a design, the communication apparatus may include a processing module and a communication module. The processing module is configured to invoke the communication module to perform a receiving function and/or a sending function. For example, a receiving module is configured to receive first information from a first communication apparatus, where the first information indicates a pulse repetition interval PRI. A sending module is configured to send a reference signal based on the first information, where a periodicity of the reference signal in time domain is less than or equal to the PRI. The reference signal is used by the first communication apparatus to sense a to-be-sensed target.

In a possible design, the receiving module is further configured to receive, from the first communication apparatus, a result of sensing the to-be-sensed target. The processing module is further configured to configure a density of the reference signal in time domain based on the result.

For beneficial effects of the second aspect or the third aspect, refer to the descriptions of the first aspect. Details are not described herein again.

With reference to the second aspect or the third aspect, the following provides some possible designs.

In a possible design, the PRI is determined based on a maximum movement speed of the to-be-sensed target and a wavelength of the reference signal. Optionally, the maximum movement speed of the to-be-sensed target may be preset.

In a possible design, the PRI conforms to the following relational expression: the PRI is less than or equal to $\lambda/V_{max}$, where $\lambda$ is the wavelength of the reference signal, and $V_{max}$ is the maximum movement speed of the to-be-sensed target. After receiving the first information, the second communication apparatus determines the PRI based on the first information, a value of the determined PRI may be considered as a PRI reference value or a PRI threshold, and the value of the PRI can ensure that a Doppler change range generated based on the maximum movement speed of the to-be-sensed target does not exceed a maximum measurable Doppler range determined based on a length of the PRI. When the periodicity of the reference signal in time domain is less than or equal to the PRI, a maximum measurable Doppler range determined based on the periodicity of the reference signal in time domain is greater than or equal to the maximum measurable Doppler range determined based on the length of the PRI. Therefore, the periodicity of the reference signal in time domain can also meet that the Doppler change range generated based on the maximum movement speed of the to-be-sensed target does not exceed the maximum measurable Doppler range determined based on the periodicity of the reference signal in time domain. A speed measurement blur does not occur, and accuracy of speed measurement is improved, thereby helping improve sensing performance.

In a possible design, the first information further indicates a coherent processing interval CPI; and a length of the reference signal is greater than or equal to a length of the CPI. The first information indicates the CPI, and the second communication apparatus may send the reference signal based on the CPI. The length of the reference signal is limited to be greater than or equal to the length of the CPI. This helps ensure that there is sufficient accumulation time during processing of the reference signal, ensure a signal-to-noise ratio, and improve sensing performance. Sensing performance can be ensured only when the reference signal is used for sensing.

In a possible design, the CPI may be determined based on one or more of the following: a relative movement speed between the first communication apparatus and the to-be-sensed target, a range resolution unit, relative movement acceleration between the first communication apparatus and the to-be-sensed target, or a speed resolution unit. Optionally, the CPI is determined based on a first value and/or a second value. The first value is determined based on the range resolution unit and the relative movement speed between the first communication apparatus and the to-be-sensed target, and the second value is determined based on the speed resolution unit and the relative movement acceleration between the first communication apparatus and the to-be-sensed target. If a movement range of the to-be-sensed target exceeds one range resolution unit in duration of one CPI, a result of sensing obtained by processing a signal in the duration of the CPI is inaccurate. Determining the CPI based on the range resolution unit and the relative movement speed between the first communication apparatus and the to-be-sensed target can help implement effective signal accumulation. If a speed change of the to-be-sensed target exceeds one speed resolution unit in duration of one CPI, a result of sensing obtained by processing a signal in the duration of the CPI is inaccurate. Determining the CPI based on the speed resolution unit and the relative movement acceleration between the first communication apparatus and the to-be-sensed target can help implement effective signal accumulation.

In a possible design, the CPI is a smaller one of the first value and the second value. In this way, the CPI can be determined based on range resolution and speed resolution, and sensing performance can be further improved.

In a possible design, the CPI conforms to the following relational expression: the CPI is less than or equal to $\Delta R/v$, where $\Delta R$ is the range resolution unit, and $v$ is the relative movement speed between the first communication apparatus and the to-be-sensed target. For example, the foregoing first value may be $\Delta R/v$. Under the constraint of the relational expression, it can be ensured that the to-be-sensed target does not span one range resolution unit in the duration of one CPI, to ensure sensing performance.

In a possible design, $\Delta R=c/B$, where $c$ is a speed of light, and $B$ is a bandwidth of the reference signal.

In a possible design, the CPI conforms to the following relational expression: the CPI is less than or equal to $\Delta v/a$, where $\Delta v$ is the speed resolution unit, and a is the relative movement acceleration between the first communication apparatus and the to-be-sensed target. Under the constraint of the relational expression, it can be ensured that the speed change of the to-be-sensed target cannot exceed one speed resolution unit in the duration of one CPI, to ensure sensing performance.

In a possible design, $\Delta v=\lambda/CPI$, where $\lambda$ is the wavelength of the reference signal. For example, the second value is $\sqrt{\lambda/a}$.

Optionally, a value of v and/or a value of a may be obtained in the following manner. The second communication apparatus sends the reference signal to the first communication apparatus. The length and a sending location of the reference signal may be determined in any manner, for example, a reference signal that is sent when there is data transmission and that is used to measure a channel condition. After receiving the reference signal, the first communication apparatus estimates the value of v and/or the value of a based on the reference signal. Alternatively, initial values of v and a may be obtained through measurement of a sensor of the to-be-sensed target.

According to a fourth aspect, an embodiment of this application provides a communication apparatus. The communication apparatus includes a communication interface and a processor, and the communication interface is used by the apparatus to communicate with another device, for example, to receive or send data or a signal. For example, the communication interface may be a transceiver, a circuit, a bus, a module, or another type of communication interface. The processor is configured to invoke a group of programs, instructions, or data, to perform the method implemented by the first communication apparatus in the first aspect. The apparatus may further include a memory, configured to store the programs, the instructions, or the data invoked by the processor. The memory is coupled to the processor. When the processor executes the instructions or the data stored in the memory, the method performed by the first communication apparatus described in the first aspect may be implemented.

According to a fifth aspect, an embodiment of this application provides a communication apparatus. The communication apparatus includes a communication interface and a processor, and the communication interface is used by the apparatus to communicate with another device, for example, to receive or send data or a signal. For example, the communication interface may be a transceiver, a circuit, a bus, a module, or another type of communication interface. The processor is configured to invoke a group of programs, instructions, or data, to perform the method implemented by the second communication apparatus in the first aspect. The apparatus may further include a memory, configured to store the programs, the instructions, or the data invoked by the processor. The memory is coupled to the processor. When the processor executes the instructions or the data stored in the memory, the method performed by the second communication apparatus described in the first aspect may be implemented.

According to a sixth aspect, an embodiment of this application further provides a computer-readable storage medium. The computer-readable storage medium stores computer-readable instructions. When the computer-readable instructions are run on a computer, the method in any one of the first aspect or the possible designs of the first aspect is performed.

According to a seventh aspect, an embodiment of this application provides a chip system. The chip system includes one or more processors. The one or more processors are configured to read and execute a software program stored in a memory, to implement the method performed by the first communication apparatus in any one of the first aspect or the possible designs of the first aspect. The chip system may include a chip, or may include a chip and another discrete device.

Optionally, the chip system may include the memory, or the chip system is connected to the memory.

According to an eighth aspect, an embodiment of this application provides a chip system. The chip system includes one or more processors. The one or more processors are configured to read and execute a software program stored in a memory, to implement the method performed by the second communication apparatus in any one of the first aspect or the possible designs of the first aspect. The chip system may include a chip, or may include a chip and another discrete device.

Optionally, the chip system may include the memory, or the chip system is connected to the memory.

According to a ninth aspect, an embodiment of this application provides a communication system. The communication system includes the communication apparatuses in the second aspect and the third aspect; or includes the communication apparatuses in the fourth aspect and the fifth aspect.

According to a tenth aspect, a computer program product including instructions is provided. When the computer program product runs on a computer, the method in any one of the first aspect or the possible designs of the first aspect is implemented.

DESCRIPTION OF EMBODIMENTS

Embodiments of this application provide a reference signal-based sensing method and a communication apparatus. The method and the apparatus are based on a same technical concept or are based on a similar technical concept. Because problem-resolving principles of the method and the apparatus are similar, mutual reference may be made to implementations of the apparatus and the method. Repeated parts are not described again.

In descriptions of embodiments of this application, the term "and/or" describes an association relationship between associated objects, and indicates that three relationships may exist. For example, A and/or B may indicate the following three cases: Only A exists, both A and B exist, and only B exists. In this application, "a plurality of" means two or more. In addition, it should be understood that in descriptions of this application, terms such as "first" and "second" are merely used for distinguishing and description, but should not be understood as indicating or implying relative importance, or should not be understood as indicating or implying a sequence.

The following describes in detail embodiments of this application with reference to the accompanying drawings.

A reference signal-based sensing method and a communication apparatus provided in embodiments of this application may be used in a 4th generation (4G) communication system, for example, a long term evolution (LTE) system, or a 5th generation (5G) communication system, for example, a 5G new radio (NR) system, or may be used in various communication systems that evolve in the future, for example, a 6th generation (6G) communication system or a land-sea-air-space integrated communication system.

Figure 1:
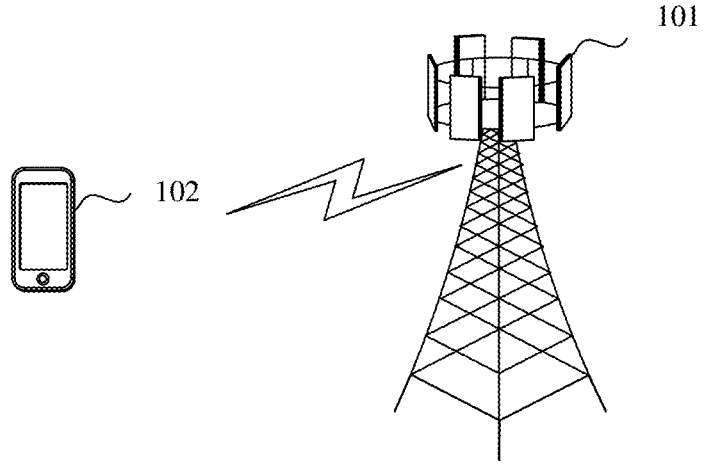
FIG. 1 is a schematic diagram of an architecture of a communication system according to an embodiment of this application.

FIG. 1 shows an architecture of a communication system to which an embodiment of this application is applicable. As shown in FIG. 1, a communication system 100 includes a network device 101 and a terminal device 102.

First, possible implementation forms and functions of the network device 101 and the terminal device 102 are described by using an example.

The network device 101 provides a service for the terminal device 102 within coverage. For example, as shown in FIG. 1, the network device 101 provides wireless access for one or more terminal devices 102 within coverage of the network device 101.

The network device 101 is a node in a radio access network (RAN), may also be referred to as a base station, and may further be referred to as a RAN node (or device). Currently, some examples of the network device 101 are as follows: a next generation NodeB (gNB), a next generation evolved NodeB (Ng-eNB), a transmission reception point (TRP), an evolved NodeB (eNB), a radio network controller (RNC), a NodeB (NB), a home base station (such as a home evolved NodeB or a home NodeB, HNB), a baseband unit (BBU), an active antenna processing unit (AAU), or a wireless fidelity (Wi-Fi) access point (AP). Alternatively, the network device 101 may be a satellite. The satellite may also be referred to as a high-altitude platform, a high-altitude aircraft, or a satellite base station. The network device 101 may alternatively be another device having a network device function. For example, the network device 101 may alternatively be a device that functions as a network device in device-to-device (D2D) communication, internet of vehicles communication, or machine-to-machine (M2M) communication. Alternatively, the network device 101 may be any possible network device in a future communication system.

The terminal device 102 is also be referred to as user equipment (UE), a mobile station (MS), a mobile terminal (MT), or the like, and is a device that provides a user with voice and/or data connectivity. For example, the terminal device 102 includes a handheld device or a vehicle-mounted device having a wireless connection function. Currently, the terminal device 102 may be: a mobile phone, a tablet computer, a notebook computer, a palmtop computer, a mobile internet device (MID), a wearable device (such as a smartwatch, a smart band, or a pedometer), a vehicle-mounted device (such as a car, a bicycle, an electric car, an airplane, a ship, a train, or a high-speed rail), a virtual reality (VR) device, an augmented reality (ΔR) device, a wireless terminal in industrial control, a smart home device (such as a refrigerator, a television, an air conditioner, or a meter), an intelligent robot, a workshop device, a wireless terminal in self driving, a wireless terminal in remote medical surgery, a wireless terminal in a smart grid, a wireless terminal in transportation safety, a wireless terminal in a smart city, a wireless terminal in a smart home, a flight device (such as an intelligent robot, a hot air balloon, an uncrewed aerial vehicle, or an airplane), or the like. The terminal device 102 may alternatively be another device having a terminal device function. For example, the terminal device 102 may alternatively be a device that functions as a terminal device in device-to-device (D2D) communication, internet of vehicles communication, or machine-to-machine (M2M) communication. In particular, when communication is performed between network devices, a network device that functions as a terminal device may also be considered as a terminal device.

In a wireless sensing technology, changes of radio signals are analyzed in a propagation process to obtain a characteristic of signal propagation space and sense a scenario. Because a process of a wireless communication technology is similar to that of the wireless sensing technology, the wireless communication technology and the wireless sensing technology may be combined to sense a surrounding environment while communication is implemented.

In an implementation, a resource dedicated to sensing may be allocated on a time domain resource or a frequency domain resource in a time division or frequency division manner. In this manner, both a communication function and a sensing function may be implemented by a set of hardware, and in addition, interference between communication and sensing may be avoided. However, sensing is implemented in this manner, an additional communication resource is occupied, and communication efficiency is reduced.

Based on this, in another implementation, sensing may be implemented by using a reference signal for communication. In a wireless communication system, channel estimation may usually be implemented by using a reference signal. The reference signal is a sequence known to a transmitting end and a receiving end. The transmitting end sends the reference signal to the receiving end, and the receiving end performs channel estimation by detecting the reference signal, and feeds back a channel estimation result to the transmitting end. In this implementation, a signal dedicated to sensing may not be designed, and sensing is performed by using an existing reference signal. A communication resource does not need to be occupied, and the communication resource can be saved.

Embodiments of this application provide a sensing method and a communication apparatus, to describe how to implement sensing by using a reference signal and improve sensing performance.

The reference signal is first described, and the reference signal may also be referred to as a pilot signal. In embodiments of this application, the reference signal for implementing sensing may be any signal provided that the reference signal is a sequence known to a transmitting end and a receiving end. For example, the reference signal may be a channel state information reference signal (CSI-RS) or a demodulation reference signal (DMRS).

Figure 2:
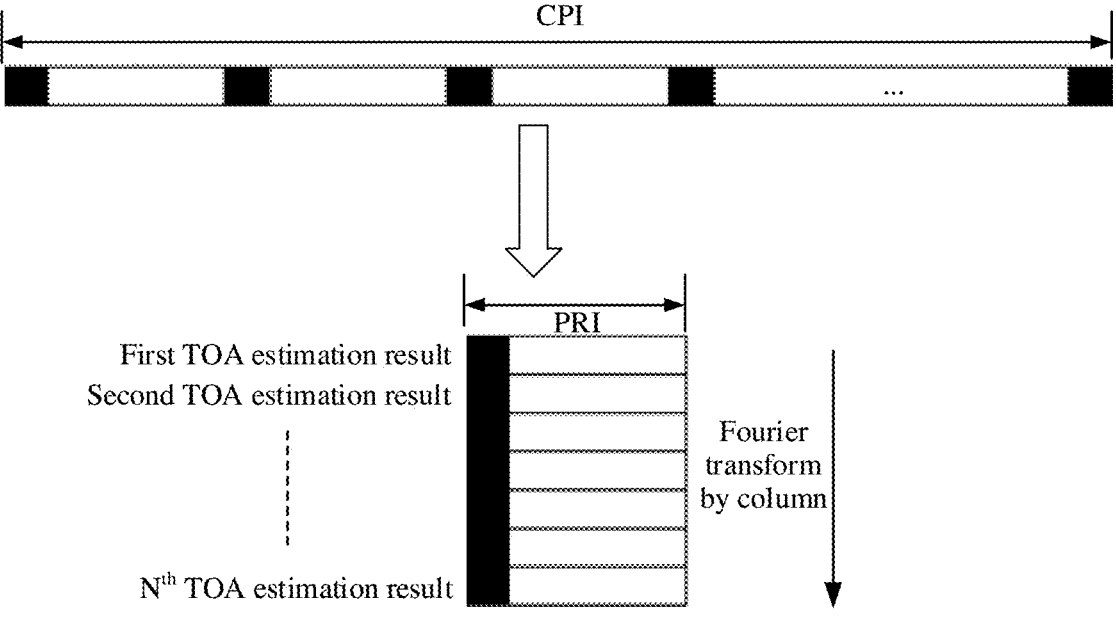
FIG. 2 is a schematic diagram of two-dimensional matrix signal processing of sensing based on a reference signal according to an embodiment of this application.

The transmitting end sends the reference signal to the receiving end, the receiving end receives the reference signal, and the receiving end processes the reference signal to obtain a result of sensing. The following describes an optional manner of performing sensing based on the reference signal. As shown in FIG. 2, the receiving end selects a signal whose length is a coherent processing interval (CPI). The reference signal is a periodic signal. FIG. 2 shows reference signals of a plurality of periodicities, and a black rectangle in the signal whose length is the CPI indicates a location of the reference signal. The signal whose length is the CPI is rearranged into a two-dimensional matrix based on a row. A length of each row of the matrix is a pulse repetition interval (PRI). The PRI in FIG. 2 is a periodicity length of the reference signal in time domain. Because the location and the sequence of the reference signal are known, the receiving end knows the location and the sequence of the reference signal transmitted by the transmitting end, and the receiving end performs processing by row by using the received reference signal and the known transmitted reference signal, for example, matched filtering processing or multi-carrier range estimation processing, to obtain time of arrival (TOA) estimation result. A TOA estimation result may be obtained for a signal in each row. For example, as shown in FIG. 2, a signal whose length is the PRI in a first row is processed to obtain a first TOA result, and a signal whose length is the PRI in a second row is processed to obtain a second TOA result, . . . , and a signal whose length is the PRI in an $N^{th}$ row is processed to obtain an $N^{th}$ TOA result. The TOA result of each row may be considered as a one-dimensional range profile. Fourier transform is performed on a matrix formed by N one-dimensional range profiles by column, and Doppler frequency information of a to-be-sensed target may be obtained. A row of a two-dimensional matrix after signal processing represents range information, and a column represents Doppler frequency information. The range information and the Doppler frequency information may form a two-dimensional image, that is, a range-Doppler map. A vertical coordinate of the image is a relative rate of the to-be-sensed target and the receiving end. In a scenario in which the to-be-sensed target does not send or receive a reference signal, but forwards the reference signal of the transmitting end to the receiving end, a horizontal coordinate of the image is a relative range from the transmitting end to the receiving end. Alternatively, in another scenario, for example, a scenario in which the to-be-sensed target sends a reference signal, or a scenario in which the to-be-sensed target receives a reference signal, a horizontal coordinate of the image is a relative range from the to-be-sensed target to the receiving end.

Herein, the receiving end may obtain, based on the reference signal, a result of sensing the to-be-sensed target. The result of sensing may be, for example, the relative range from the to-be-sensed target to the receiving end. In a scenario in which the to-be-sensed target does not send or receive the reference signal, but forwards the reference signal of the transmitting end to the receiving end, the result of sensing may be a sum of a range from the transmitting end to the to-be-sensed target and a range from the to-be-sensed target to the receiving end. The result of sensing the to-be-sensed target obtained based on the reference signal may alternatively be the relative rate of the to-be-sensed target and the receiving end.

When the reference signal is used for communication, there are some limitations. For example, in a 5G communication system, some reference signals are not always on, and exist only when data is sent. In addition, because duration of continuously sending data packets is determined based on a service requirement of a user, when the duration of continuously sending the data packets is short, a length of a reference signal is also short. When the reference signal is used for sensing, the foregoing limitations of the reference signal may cause that sensing performance cannot be ensured.

Figure 3:
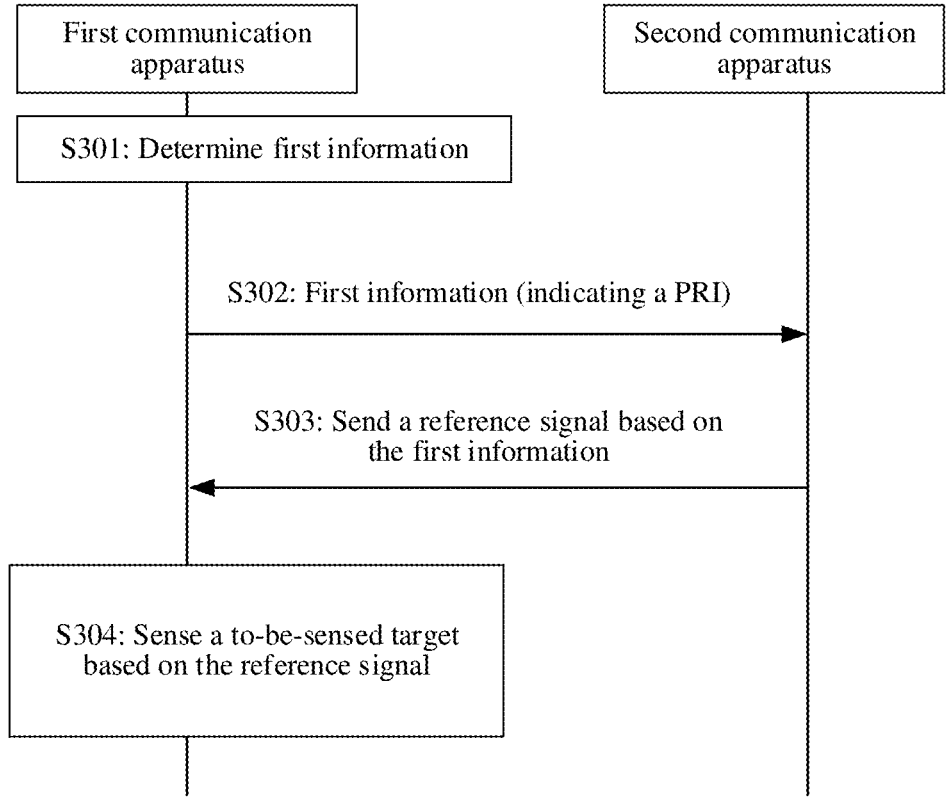
FIG. 3 is a specific schematic flowchart of a sensing method according to an embodiment of this application.

As shown in FIG. 3, a specific procedure of a sensing method provided in an embodiment of this application is described as follows. The method may be performed by a first communication apparatus and a second communication apparatus. The first communication apparatus may be a device for receiving a reference signal, and the second communication apparatus may be a device for sending the reference signal. From perspectives of sending and receiving the reference signal, the first communication apparatus may also be referred to as a receiving device, a receiving node, or a receiving end, and the second communication apparatus may also be referred to as a sending device, a sending node, a transmitting node, or a transmitting end.

S301: The first communication apparatus determines first information.

The first information indicates a PRI. The first information may indicate a value of the PRI, or may indicate a related parameter of the PRI. The related parameter may indicate the PRI, or the related parameter may be used to calculate the PRI.

S302: The first communication apparatus sends the first information to the second communication apparatus. Correspondingly, the second communication apparatus receives the first information from the first communication apparatus.

The first information is used by the second communication apparatus to send the reference signal.

S303: The second communication apparatus sends the reference signal to the first communication apparatus. Correspondingly, the first communication apparatus receives the reference signal from the second communication apparatus.

The second communication apparatus sends the reference signal to the first communication apparatus based on the first information. A periodicity of the reference signal in time domain is less than or equal to the PRI.

S304: The first communication apparatus senses a to-be-sensed target based on the reference signal.

For a method for sensing the to-be-sensed target based on the reference signal, refer to the foregoing related descriptions in FIG. 2. Details are not described herein again.

The first information indicates the PRI, and the second communication apparatus may send the reference signal based on the PRI. The periodicity of the reference signal in time domain is limited to be less than or equal to the PRI.

In this way, when processing the reference signal, the first communication apparatus rearranges the reference signal into a two-dimensional matrix. A length of each row in the matrix is the PRI, a TOA estimation result may be obtained for a signal of each row, and a column of the two-dimensional matrix obtained after signal processing indicates Doppler frequency information, so that obtained Doppler information is more accurate and sensing performance is improved.

The following describes some optional implementations of the embodiment in FIG. 3.

First, impact of a length of the PRI on sensing performance is described. The length of the PRI may affect a maximum measurable Doppler range. A smaller length of the PRI indicates a larger maximum measurable Doppler range. A Doppler change range of the to-be-sensed target should not exceed the maximum measurable Doppler range determined based on the length of the PRI. A Doppler change of the to-be-sensed target is generated based on a movement speed. Therefore, it needs to be ensured that a Doppler change range generated based on a maximum movement speed of the to-be-sensed target does not exceed the maximum measurable Doppler range determined based on the length of the PRI. The PRI is determined based on the maximum movement speed of the to-be-sensed target and a wavelength of the reference signal.

The first communication apparatus first obtains the maximum movement speed of the to-be-sensed target, and determines the PRI based on the maximum movement speed of the to-be-sensed target and the wavelength of the reference signal. The maximum movement speed of the to-be-sensed target may be preset. For example, a correspondence between a different scenario and a maximum movement speed may be predefined. The scenario may be, for example, an urban area communication scenario or a high-speed communication scenario. The first communication apparatus determines, based on the predefined correspondence, a maximum movement speed of a to-be-sensed target corresponding to a current scenario. If the first communication apparatus is a terminal device, the terminal device may receive information about the maximum movement speed of the to-be-sensed target from a network device, or the terminal device may receive the current scenario from the network device, and determine, based on the predefined correspondence between a different scenario and a maximum movement speed, the maximum movement speed of the to-be-sensed target corresponding to the current scenario.

In an implementation, the PRI conforms to the following relational expression (1): the PRI is less than or equal to $\lambda/V_{max}$, where $\lambda$ is the wavelength of the reference signal, and $V_{max}$ is the maximum movement speed of the to-be-sensed target.

The first communication apparatus determines the value of the PRI according to the foregoing relational expression (1). The first information may be the value of the PRI, and the second communication apparatus may obtain the value of the PRI based on the first information. Alternatively, the first information may indicate $V_{max}$, or may indicate $V_{max}$ and $\lambda$. The second communication apparatus determines the PRI based on $V_{max}$ and $\lambda$. For example, the PRI may be determined according to the foregoing relational expression (1). The first information may further indicate an index, and the index may be an index of the PRI, or may be an index of $V_{max}$. The second communication apparatus stores a correspondence between an index of the PRI and a value of the PRI, or may store a correspondence between an index of $V_{max}$ and $V_{max}$. If the first information indicates the index of the PRI, the second communication apparatus determines the value of the PRI based on the index of the PRI indicated by the first information. If the first information indicates the index of $V_{max}$, the second communication apparatus may determine a value of $V_{max}$ based on the index of $V_{max}$.

After receiving the first information, the second communication apparatus determines the PRI based on the first information, the value of the determined PRI may be considered as a PRI reference value or a PRI threshold, and the value of the PRI can ensure that the Doppler change range generated based on the maximum movement speed of the to-be-sensed target does not exceed the maximum measurable Doppler range determined based on the length of the PRI.

The second communication apparatus determines that the periodicity of the reference signal in time domain is less than or equal to the PRI. It can be learned that because a smaller PRI indicates a larger maximum measurable Doppler range, when the periodicity of the reference signal in time domain is less than or equal to the PRI, the maximum measurable Doppler range determined based on the periodicity of the reference signal in time domain is greater than or equal to the maximum measurable Doppler range determined based on the length of the PRI. Therefore, the periodicity of the reference signal in time domain can also meet that the Doppler change range generated based on the maximum movement speed of the to-be-sensed target does not exceed the maximum measurable Doppler range determined based on the periodicity of the reference signal in time domain. A speed measurement blur does not occur, and accuracy of speed measurement is improved, thereby helping improve sensing performance.

It can be learned from FIG. 2 that, when the reference signal is processed, the PRI is obtained through division by row. To ensure that Fourier transform is performed on a column to obtain speed information, rows change periodically. For example, FIG. 2 shows a case in which one row is a periodicity of one reference signal in time domain, that is, one row is one periodicity. Certainly, one row may alternatively be a plurality of periodicities of one reference signal in time domain, that is, one row is a plurality of periodicities. An example in which one row is one periodicity is used. The PRI determined based on the first information may be considered as a threshold, and is denoted as a PRI threshold. When the second communication apparatus actually sends the reference signal, the periodicity of the reference signal in time domain needs to be less than or equal to the PRI threshold. When receiving the reference signal and processing the reference signal, the first communication apparatus may perform row division on a matrix based on the periodicity of the reference signal in time domain. Herein, the periodicity of the reference signal in time domain may be considered as an actual PRI, and the actual PRI is less than or equal to the PRI threshold, to ensure sensing performance.

It may be understood that a row of the matrix may alternatively be an integer multiple of the periodicity of the reference signal in time domain, and it can also be ensured that the speed information is obtained by performing Fourier transform on the column. In this case, the integer multiple of the periodicity of the reference signal in time domain needs to be less than or equal to the PRI.

The first information may further indicate a CPI. The first information may indicate a value of the CPI, or may indicate a related parameter of the CPI. The related parameter may indicate the CPI, or the related parameter may be used to calculate the CPI. A length of the reference signal is greater than or equal to a length of the CPI. The first information indicates the CPI, and the second communication apparatus may send the reference signal based on the CPI. The length of the reference signal is limited to be greater than or equal to the length of the CPI. In this way, sensing performance can be ensured only when the reference signal is used for sensing.

The following describes impact of the length of the CPI on sensing performance. From a perspective of a signal-to-noise ratio, a longer CPI indicates longer signal coherent integration time, so that the signal-to-noise ratio can be improved and sensing performance can be improved. A longer CPI indicates higher Doppler resolution. However, the length of the CPI also needs to meet some conditions, for example, any one or more of the following condition 1 or condition 2.

For example, condition 1: It is required that a movement range of the to-be-sensed target cannot exceed one range resolution unit in duration of one CPI. If the movement range of the to-be-sensed target exceeds one range resolution unit in the duration of one CPI, a result of sensing obtained by processing a signal in the duration of the CPI is inaccurate, or it is considered as ineffective signal accumulation. To implement effective signal accumulation, a result of sensing obtained by processing a signal in the duration of the CPI is more accurate, and the foregoing condition 1 needs to be met.

The value of the CPI is determined based on the range resolution unit and a relative movement speed between the first communication apparatus and the to-be-sensed target. For example, the CPI conforms to the following relational expression (2): the CPI is less than or equal to $\Delta R/v$, where $\Delta R$ is the range resolution unit, and v is the relative movement speed between the first communication apparatus and the to-be-sensed target. Under the constraint of the relational expression (2), it can be ensured that the to-be-sensed target does not span one range resolution unit in the duration of one CPI, to ensure sensing performance. The range resolution unit refers to a minimum range that distinguishes two same target points in range. The two same target points may be two target points that have a same size, volume, material, and the like. The range resolution unit may be defined in a protocol. If the first communication apparatus is a terminal device, the terminal device may determine the range resolution unit based on the protocol definition, or may obtain information about the range resolution unit from the network device. Optionally, the range resolution unit $\Delta R$ may be determined according to the following formula: $\Delta R=c/B$, where c is a speed of light, and B is a bandwidth of the reference signal. For example, if a minimum frequency of the reference signal is $f_0$ and a maximum frequency of the reference signal is $f_N$, the bandwidth of the reference signal is defined as $B=f_N-f_0$. $\Delta R=c/B$ is substituted into the foregoing relational expression (2) to obtain a modified relational expression (3) of the relational expression (2): the CPI is less than or equal to c/Bv. For ease of description, $\Delta R/v$ may be denoted as a first value, and the first value may alternatively be c/Bv.

For another example, condition 2: It is required that a speed change of the to-be-sensed target cannot exceed one speed resolution unit in duration of one CPI. If the speed change of the to-be-sensed target exceeds one speed resolution unit in the duration of one CPI, a result of sensing obtained by processing a signal in the duration of the CPI is inaccurate, or it is considered as ineffective signal accumulation. To implement effective signal accumulation, a result of sensing obtained by processing a signal in the duration of the CPI is more accurate, and the foregoing condition 2 needs to be met.

The value of the CPI is determined based on the speed resolution unit and relative movement acceleration between the first communication apparatus and the to-be-sensed target. For example, the CPI conforms to the following relational expression (4): the CPI is less than or equal to $\Delta v/a$, where $\Delta v$ is the speed resolution unit, and a is the relative movement acceleration between the first communication apparatus and the to-be-sensed target. Under the constraint of the relational expression (4), it can be ensured that the speed change of the to-be-sensed target cannot exceed one speed resolution unit in the duration of one CPI, to ensure sensing performance. The speed resolution unit is a minimum speed difference that distinguishes two same target points in speed. The two same target points may be two target points that have a same size, volume, material, and the like. The speed resolution unit may be defined in a protocol. If the first communication apparatus is a terminal device, the terminal device may determine the speed resolution unit based on the protocol definition, or may obtain information about the speed resolution unit from the network device. Optionally, the speed resolution unit $\Delta v$ may be determined according to the following formula: $\Delta v=k/CPI$, where $\lambda$ is the wavelength of the reference signal. $\Delta v=\lambda/CPI$ is substituted into the foregoing relational expression (4) to obtain a modified relational expression (5) of the relational expression (4): the CPI is less than or equal to $\sqrt{\lambda/a}$. For ease of description, $\sqrt{\lambda/a}$ may be denoted as a second value.

In conclusion, when the condition 1 is met, the CPI is determined based on the first value, and the first value is determined based on the range resolution unit and the relative movement speed between the first communication apparatus and the to-be-sensed target. For example, the first value is $\Delta R/v$, and the CPI may conform to the relational expression (2): the CPI is less than or equal to $\Delta R/v$; or conform to the relational expression (3): the CPI is less than or equal to c/Bv.

When the condition 2 is met, the CPI is determined based on the second value, and the second value is determined based on the speed resolution unit and relative movement acceleration between the first communication apparatus and the to-be-sensed target. For example, the second value is $\sqrt{\lambda/a}$. The CPI may conform to the relational expression (4): the CPI is less than or equal to $\Delta v/a$; or conform to the relational expression (5): the CPI is less than or equal to $\sqrt{\lambda/a}$.

When the condition 1 and the condition 2 are met, the CPI is determined based on the first value and the second value, and the CPI may conform to the relational expression (3) and the relational expression (5): the CPI is less than or equal to c/Bv, and the CPI is less than or equal to $\sqrt{\lambda/a}$.

In a possible implementation, when the condition 1 and the condition 2 are met, the CPI may conform to a relational expression (6): the CPI is less than or equal to a smaller one of the first value and the second value. For example, if the first value is less than the second value, the CPI is less than or equal to the first value. If the second value is less than the first value, the CPI is less than or equal to the second value. Assuming that the first value is c/Bv, and the second value is $\sqrt{\lambda/a}$, the CPI may be represented by using a formula as $CPI=min(c/Bv, \sqrt{\lambda/a})$.

The first communication apparatus may determine the CPI based on the first value, or may determine the CPI based on the second value, or may determine the CPI based on the first value and the second value. The first information indicates the CPI, and may directly indicate the value of the CPI. For example, the first information may indicate that the value of the CPI is a smaller one of $c/Bv$ and $\sqrt{\lambda/a}$. If $c/Bv$ is less than $\sqrt{\lambda/a}$, the first information indicates that the value of the CPI is $c/Bv$. If $\sqrt{\lambda/a}$ is less than $c/Bv$, the first information indicates that the value of the CPI is $\sqrt{\lambda/a}$. If $\sqrt{\lambda/a}$ is equal to $c/Bv$, the first information indicates that the value of the CPI is any one of a and $c/Bv$. The second communication apparatus may obtain the value of the CPI based on the first information. Alternatively, the first information may indicate a CPI-related parameter. For example, the first information indicates v and a. The second communication apparatus may determine the CPI based on known parameters B, $\lambda$, and c, and v and a indicated by the first information. Alternatively, the first information may indicate v, a, B, $\lambda$, and c. The second communication apparatus may determine the CPI based on these parameters v, a, B, $\lambda$, and c indicated by the first information. The second communication apparatus may determine the CPI according to the formula $CPI=\min(c/Bv, \sqrt{\lambda/a})$ based on the CPI-related parameter indicated by the first information.

After receiving the first information, the second communication apparatus determines the CPI based on the first information, where the value of the determined CPI may be considered as a CPI reference value or a CPI threshold, and the value of the CPI can meet at least one of the condition 1 or the condition 2. A length of a continuously sent reference signal is greater than or equal to the length of the CPI. In this way, this helps ensure that there is sufficient accumulation time during processing of the reference signal, ensure a signal-to-noise ratio, and improve sensing performance. In addition, the continuously sent reference signal can meet at least one of the condition 1 or the condition 2, to improve sensing performance.

When determining the CPI, the first communication apparatus may use the parameter v, and may further use the parameter a. v is the relative movement speed between the first communication apparatus and the to-be-sensed target, and a is the relative movement acceleration between the first communication apparatus and the to-be-sensed target. In an implementation, initial values of v and a may be obtained through measurement performed by a sensor of the to-be-sensed target. For example, the relative movement speed between the to-be-sensed target and the first communication apparatus is measured by using a gyroscope of the to-be-sensed target. For another example, the relative movement acceleration between the to-be-sensed target and the first communication apparatus is measured by using an accelerometer of the to-be-sensed target. The CPI is determined based on a parameter obtained through measurement performed by the sensor of the to-be-sensed target. In another implementation, values of v and a may be obtained in the following manner. The second communication apparatus sends a reference signal to the first communication apparatus. A length and a sending location of the reference signal may be determined in any manner, for example, a reference signal that is sent when there is data transmission and that is used to measure a channel condition. After receiving the reference signal, the first communication apparatus estimates values of v and a based on the reference signal, and the first communication apparatus determines the CPI based on the estimated values of v and a. The first communication apparatus sends the value of the determined CPI to the second communication apparatus. The second communication apparatus sends the reference signal to the first communication apparatus based on the value of the CPI, and the first communication apparatus senses the to-be-sensed target based on the reference signal. When the to-be-sensed target moves, the values of v and a may also change. The first communication apparatus obtains a result of sensing the to-be-sensed target. The result of sensing may include changed values of v and a. The first communication apparatus determines the CPI based on the changed values of v and a. The first communication apparatus sends the value of the determined CPI to the second communication apparatus. The second communication apparatus sends the reference signal to the first communication apparatus based on the value of the CPI, and the first communication apparatus senses the to-be-sensed target based on the reference signal. In this way, iteration may be performed for a plurality of times to optimize the value of the CPI and improve sensing performance. Certainly, the CPI may alternatively be determined by performing a process once.

If a length of the reference signal that is sent when there is data transmission and that is used to measure the channel condition is greater than the length of the CPI, it indicates that the reference signal meets the condition that the reference signal is greater than the length of the CPI, and may be used for sensing. When the reference signal is used for sensing, in a process of processing the reference signal, a reference signal with the length of the CPI may be truncated from the reference signal whose length is greater than the length of the CPI, and the reference signal with the length of the CPI may be processed.

The following describes types of the first communication apparatus and the second communication apparatus based on different application scenarios.

Figure 4A:
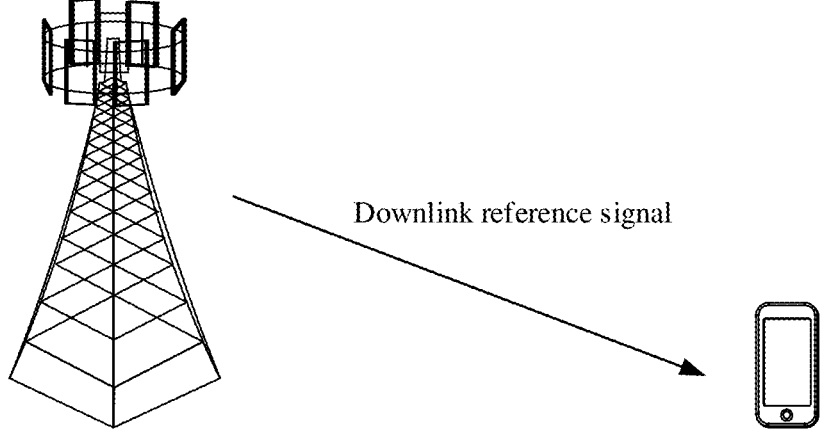
FIG. 4a is a first schematic diagram of an architecture of an application scenario according to an embodiment of this application.

Application Scenario 1:

As shown in FIG. 4a, a network device sends a downlink reference signal to a terminal device, the terminal device is moving, the terminal device senses the terminal device based on the received downlink reference signal, and the terminal device is a to-be-sensed target. In this scenario, the first communication apparatus is the terminal device, and the second communication apparatus is the network device. The terminal device determines first information, the terminal device sends the first information to the network device, the network device receives the first information, the network device sends a reference signal to the terminal device based on the first information, the terminal device receives the reference signal, and the terminal device senses the terminal device based on the reference signal. For example, the first information may be radio resource control (RRC) signaling, or may be uplink control information (UCI).

Figures 4B, 5:
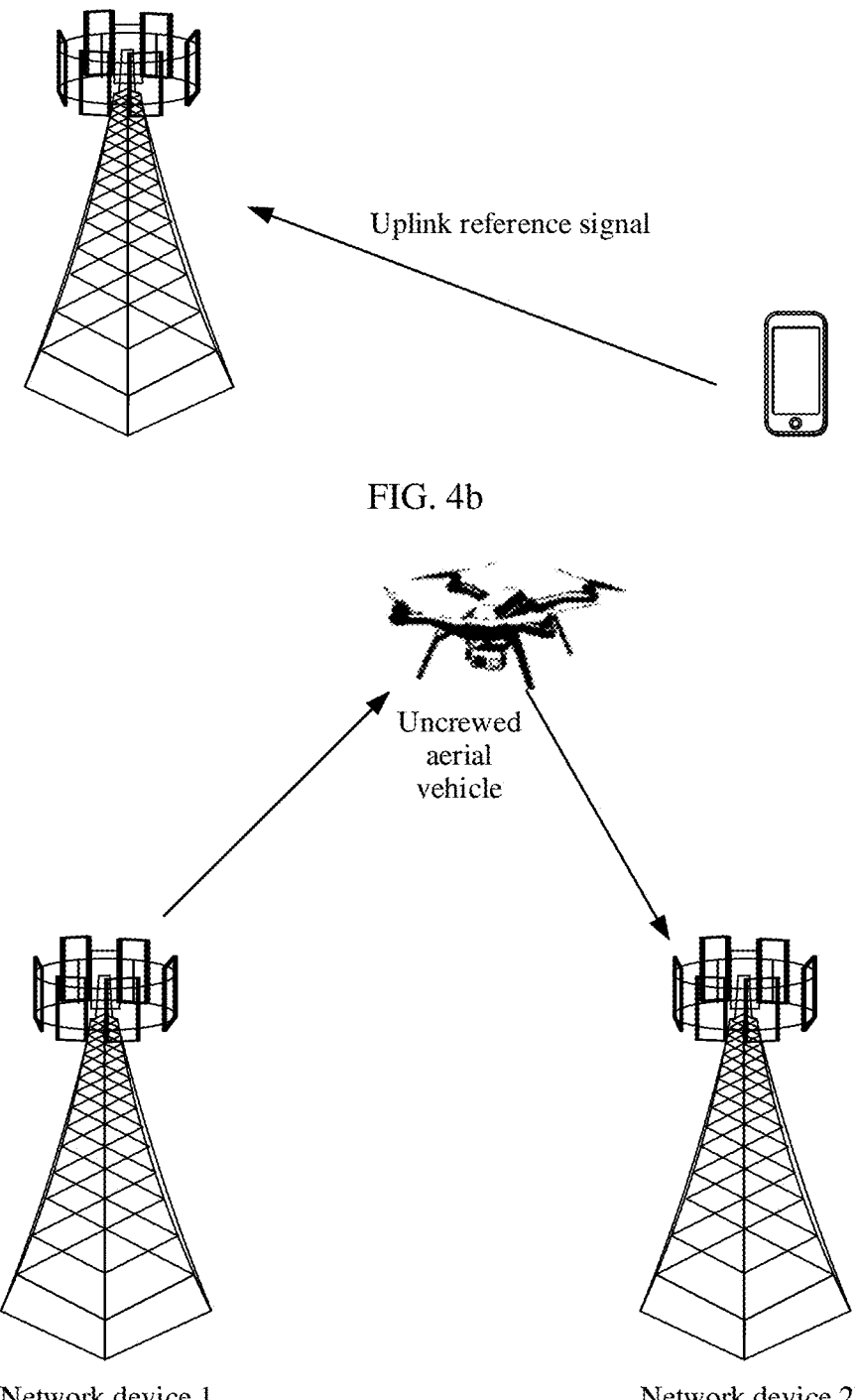
FIG. 4b is a second schematic diagram of an architecture of an application scenario according to an embodiment of this application.
FIG. 5 is a third schematic diagram of an architecture of an application scenario according to an embodiment of this application.

Application Scenario 2:

As shown in FIG. 4b, a terminal device sends an uplink reference signal to a network device, the terminal device is moving, the network device senses the terminal device based on the received uplink reference signal, and the terminal device is a to-be-sensed target. In this scenario, the first communication apparatus is the network device, and the second communication apparatus is the terminal device. The network device determines first information, the network device sends the first information to the terminal device, the terminal device receives the first information, the terminal device sends a reference signal to the network device based on the first information, the network device receives the reference signal, and the network device senses the terminal device based on the reference signal. For example, the first information may be RRC signaling, or may be downlink control information (DCI).

Application Scenario 3:

As shown in FIG. 5, an uncrewed aerial vehicle is moving, and the uncrewed aerial vehicle is a to-be-sensed target. A network device 1 sends a reference signal, the uncrewed aerial vehicle reflects the reference signal to a network device 2, the network device 2 receives the reference signal, and the network device 2 senses the uncrewed aerial vehicle based on the received reference signal. In this scenario, the first communication apparatus is the network device 2, and the second communication apparatus is the network device 1. The network device 2 determines first information, the network device 2 sends the first information to the network device 1, the network device 1 receives the first information from the network device 2, the network device 1 sends a reference signal based on the first information, the network device 2 receives the reference signal, and the network device 2 senses the uncrewed aerial vehicle based on the reference signal. For example, the first information may be X2 interface signaling.

Figure 6:
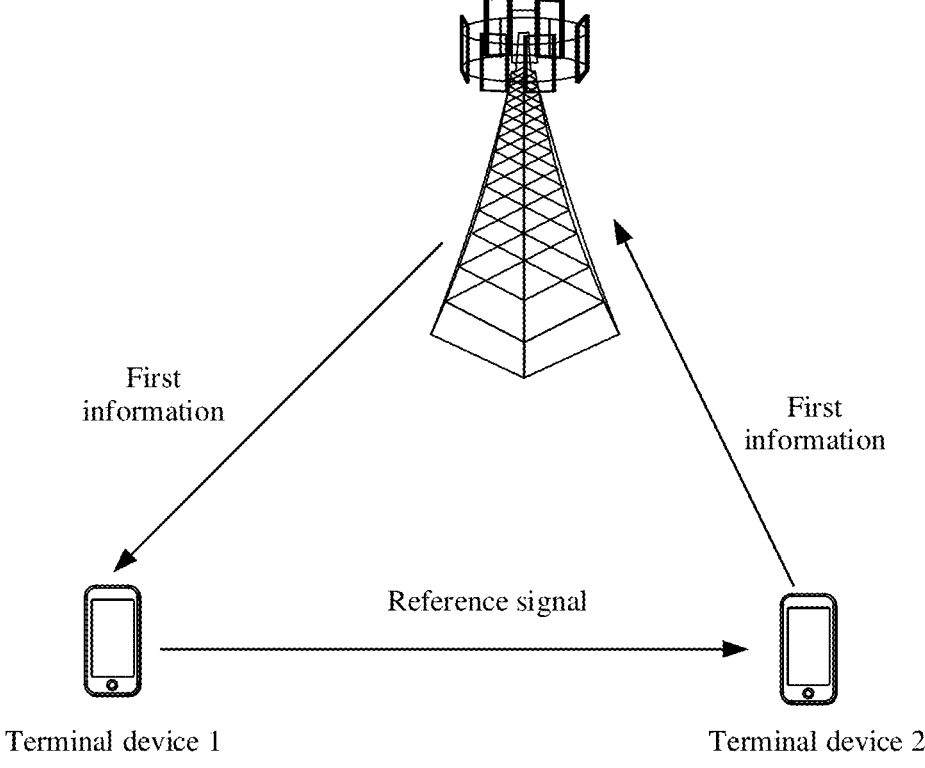
FIG. 6 is a fourth schematic diagram of an architecture of an application scenario according to an embodiment of this application.

Application Scenario 4:

Both the first communication apparatus and the second communication apparatus are terminal devices. In this case, first information may be forwarded through a control node. The first communication apparatus determines the first information, the first communication apparatus sends the first information to the control node, the control node receives the first information from the first communication apparatus, the control node forwards the first information to the second communication apparatus, and the second communication apparatus receives the first information from the control node. As shown in FIG. 6, the first communication apparatus is a terminal device 2, the second communication apparatus is a terminal device 1, and the network device is a control node. The terminal device 2 is moving, and the terminal device 2 is a to-be-sensed target. The terminal device 1 sends a reference signal, the terminal device 2 receives the reference signal from the terminal device 1, and the terminal device 2 senses the terminal device 2 based on the reference signal. Alternatively, the terminal device 1 is moving, the terminal device 1 is a to-be-sensed target, the terminal device 1 sends a reference signal, the terminal device 2 receives the reference signal from the terminal device 1, and the terminal device 2 senses the terminal device 1 based on the reference signal. First information sent by the terminal device 2 to the network device may be RRC signaling or UCI. First information sent by the network device to the terminal device 1 may be RRC signaling or DCI.

Application Scenario 5:

The second communication apparatus may be a plurality of devices. There is one control node in the plurality of devices. The first communication apparatus determines first information, the first communication apparatus sends the first information to the control node, the control node receives the first information from the first communication apparatus, the control node forwards the first information to another second communication apparatus, and the another second communication apparatus receives the first information from the control node.

Figure 7:
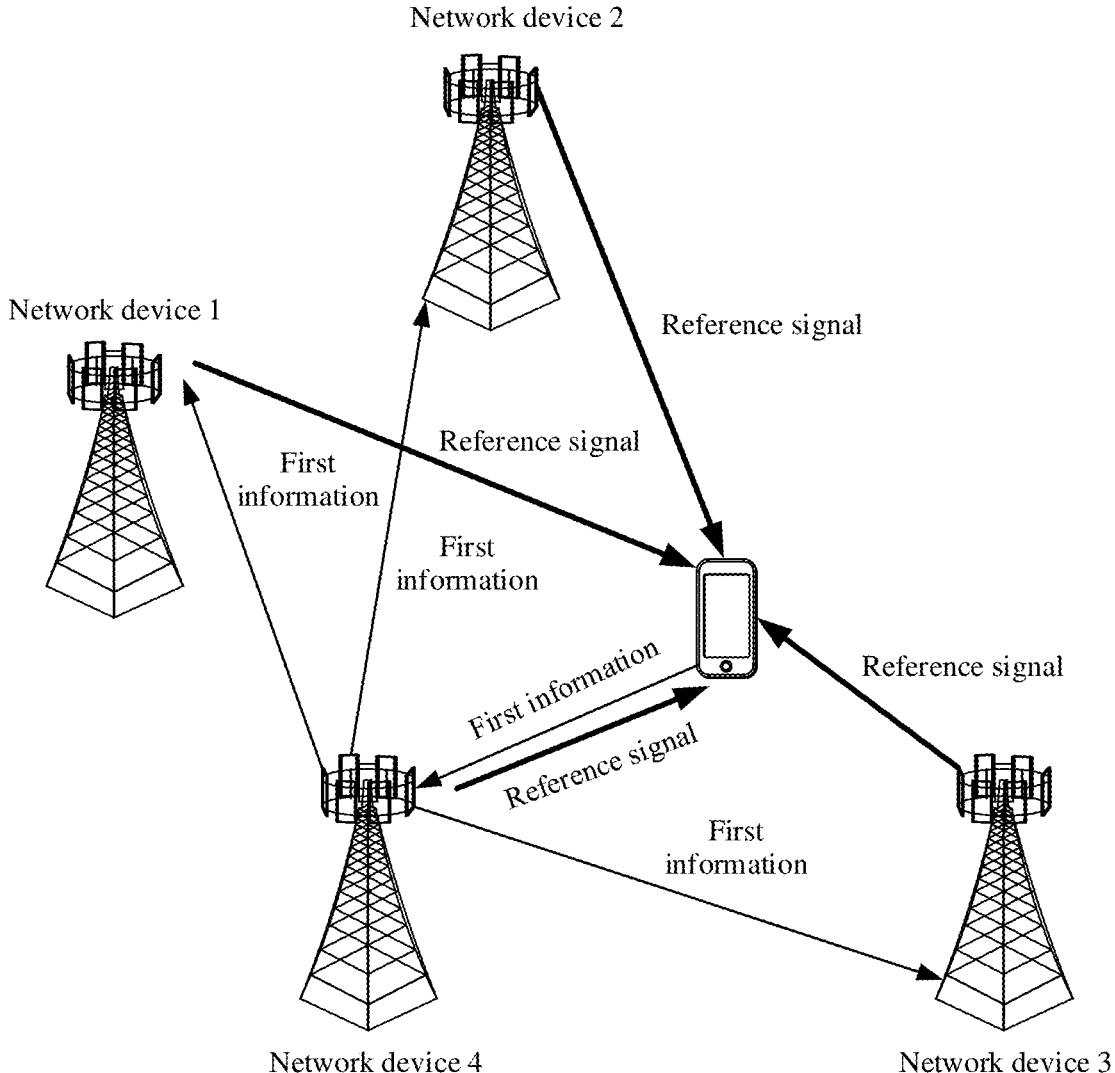
FIG. 7 is a fifth schematic diagram of an architecture of an application scenario according to an embodiment of this application.

As shown in FIG. 7, a terminal device is moving, and the terminal device is a to-be-sensed target. There are four network devices around the terminal device: a network device 1, a network device 2, a network device 3, and a network device 4. The first communication apparatus is the terminal device, and the second communication apparatus is the four network devices. It is assumed that the network device 4 is a control node. The terminal device determines first information, the terminal device sends the first information to the network device 4, and the network device 4 separately forwards the first information to the network device 1, the network device 2, and the network device 3. The four network devices respectively send downlink reference signals to the terminal device based on the first information, and the terminal device separately receives the downlink reference signals from the four network devices. The terminal device senses the terminal device based on the received downlink reference signals from the four network devices. For example, the terminal device may sense a location of the terminal device by using the downlink reference signals from the four network devices. The first information sent by the terminal device to the network device 4 may be RRC signaling or UCI, and the first information may be sent between the network devices by using X2 interface signaling.

Application Scenario 6:

The first communication apparatus may be a plurality of devices. There is one control node in the plurality of devices. The control node determines first information, the control node may receive first information sent by another first communication apparatus, and the control node determines final first information with reference to first information of a plurality of first communication apparatuses. Assuming that the first information indicates a PRI, the control node determines, based on a smallest value of a plurality of PRIs indicated by the first information of the plurality of first communication apparatuses, a PRI indicated by the final first information. Assuming that the first information indicates a CPI, the control node determines, based on a largest value of a plurality of CPIs indicated by the first information of the plurality of first communication apparatuses, a CPI indicated by the final first information. The control node sends the first information to the second communication apparatus, and the second communication apparatus receives the first information from the control node.

Figure 8:
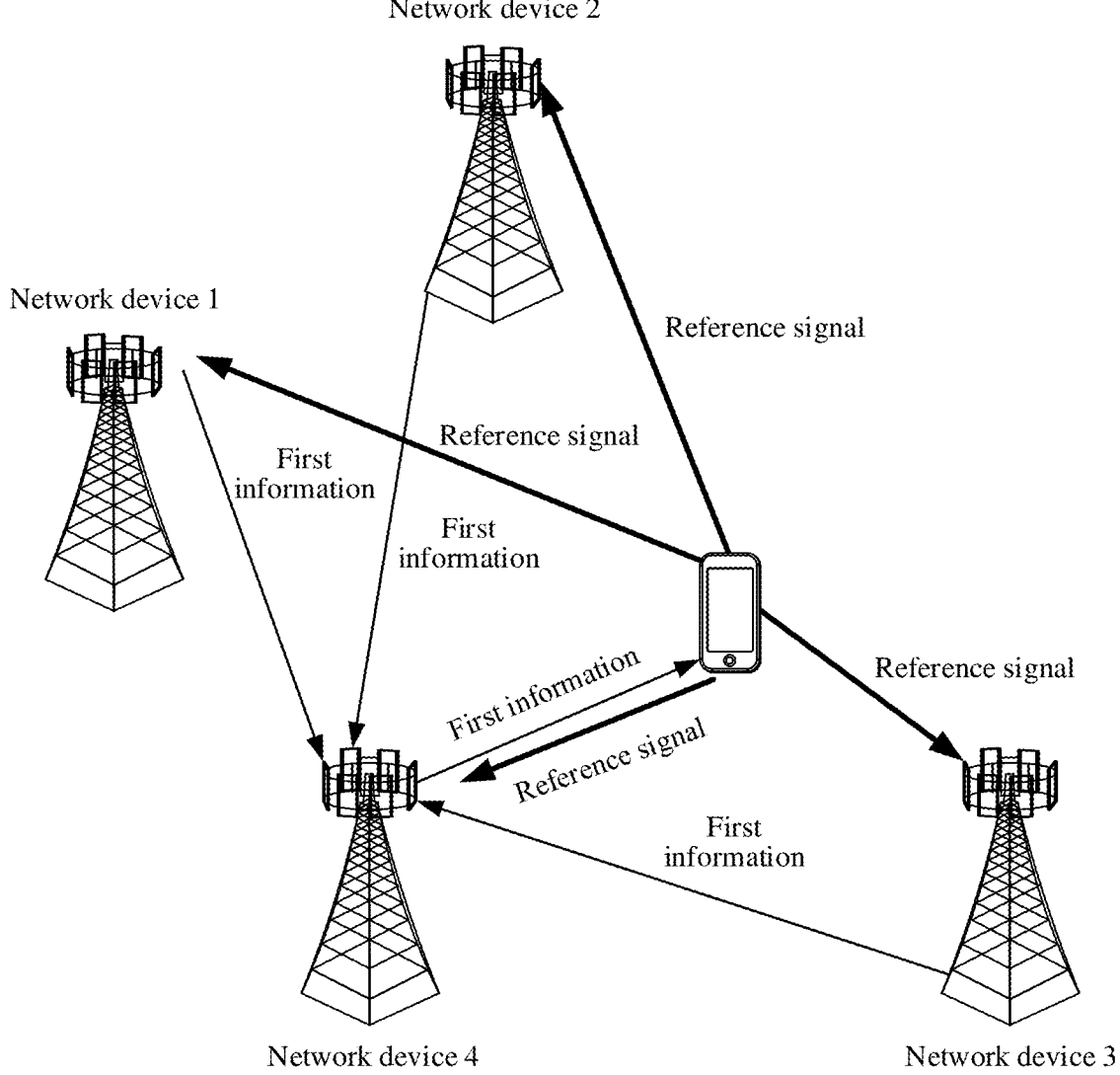
FIG. 8 is a sixth schematic diagram of an architecture of an application scenario according to an embodiment of this application.

As shown in FIG. 8, a terminal device is moving, and the terminal device is a to-be-sensed target. There are four network devices around the terminal device: a network device 1, a network device 2, a network device 3, and a network device 4. The first communication apparatus is the four network devices, and the second communication apparatus is the terminal device. It is assumed that the network device 4 is a control node. The network device 1, the network device 2, and the network device 3 separately send first information to the network device 4, and the network device 4 determines final first information with reference to the first information sent by the network device 1, the network device 2, and the network device 3. The network device 4 sends the determined first information to the terminal device, and the terminal device receives the first information from the network device 4. The terminal device sends reference signals to the four network devices based on the first information, the four network devices respectively receive the reference signals from the terminal device, and the four network devices respectively sense the terminal device based on the reference signals. The first information may be sent between the network devices by using X2 interface signaling, and the first information sent by the network device 4 to the terminal device may be RRC signaling or DCI.

Because movement of the to-be-sensed target causes a channel change, accuracy of performing channel estimation based on the reference signal is reduced, and an intensity of the channel change is related to a movement speed of the terminal device. A greater movement speed of the to-be-sensed target indicates an intenser channel change. A density of the reference signal in time domain is increased, so that accuracy of channel estimation can be improved, to improve demodulation performance of a receiver. Based on this, in embodiments of this application, the first communication apparatus may further send a result of sensing the to-be-sensed target to the second communication apparatus. The result of sensing the to-be-sensed target may be used by the second communication apparatus to configure the density of the reference signal in time domain. For example, if the to-be-sensed target is a moving device, movement of the to-be-sensed target causes a change in a receiving channel, and channel estimation is affected. The first communication apparatus senses the to-be-sensed target, obtains the result of sensing, and sends the result of sensing to the second communication apparatus. The result of sensing includes the movement speed of the to-be-sensed target. The second communication apparatus may obtain the movement speed of the to-be-sensed target based on the result of sensing, and determine the density of the reference signal in time domain based on the movement speed of the to-be-sensed target. The target moves, and the channel continuously changes. Therefore, a sampling interval $T_{ref}$ of the reference signal in time domain is equivalent to a sampling interval of the channel in time domain. A sampling rate needs to be greater than or equal to twice a highest frequency of the signal according to the Nyquist sampling theorem. Herein, a frequency of the channel change is a Doppler frequency $f_d = v/\lambda$. Therefore, a relationship $$\frac{1}{T_{ref}} \geq 2f_d$$

is obtained, that is, $$T_{ref} \leq \frac{\lambda}{2v}.$$

In other words, the sampling interval $T_{ref}$ of the reference signal in time domain is inversely proportional or negatively correlated to the movement speed, and the sampling interval of the reference signal in time domain is inversely proportional or negatively correlated to the density of the reference signal in time domain. Therefore, it can be learned that there is a positive correlation relationship between the density of the reference signal in time domain and the movement speed of the to-be-sensed target, that is, a larger movement speed of the to-be-sensed target indicates a larger determined density of the reference signal in time domain. For example, it is determined based on a first movement speed of the to-be-sensed target that the density of the reference signal in time domain is a first density, and it is determined based on a second movement speed of the to-be-sensed target that the density of the reference signal in time domain is a second density. When the first movement speed is greater than the second movement speed, the first density is also higher than the second density. In a possible implementation, a correspondence between a movement speed of the to-be-sensed target and a density of the reference signal in time domain may be set, or a correspondence between a movement speed range of the to-be-sensed target and a density of the reference signal in time domain may be set. For example, when the movement speed of the to-be-sensed target falls within a first range, a corresponding density of the reference signal in time domain is a density 1. When the movement speed of the to-be-sensed target falls within a second range, a corresponding density of the reference signal in time domain is a density 2.

Figure 9:
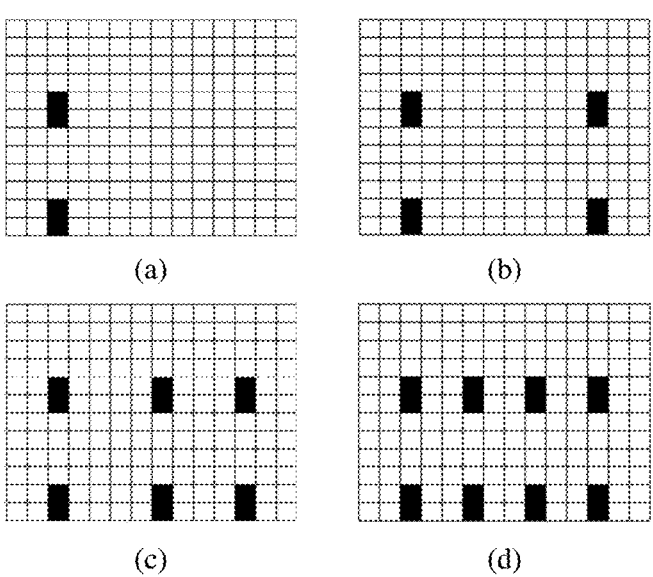
FIG. 9 is a schematic diagram of configuring DMRSs with different densities according to an embodiment of this application.

The density of the reference signal in time domain may be understood as a ratio of duration in which the reference signal appears in a periodicity to the periodicity. For example, FIG. 9 shows configurations of DMRSs with different densities. In FIG. 9, a horizontal direction is a time domain, and a vertical direction is a frequency domain. One small grid is one resource element (RE), the RE is a smallest unit that can be allocated on a time-frequency resource, and a location of a black grid is a DMRS. In (a) of FIG. 9, a density value of the DMRS in time domain is 1. A configuration of the DMRS in time domain shown in (d) of FIG. 9 is used.

S301: A first communication apparatus determines first information. S302: The first communication apparatus sends the first information to a second communication apparatus. Before S301, the first communication apparatus may enable a sensing function. That is, the first communication apparatus has a function of enabling and disabling the sensing function, and when the sensing function is disabled, sensing is not performed by using the method in the embodiment in FIG. 3. When the first communication apparatus enables the sensing function, sensing may be performed by using the method in the embodiment in FIG. 3. In this way, when sensing needs to be performed based on the reference signal, the second communication apparatus may enable a sensing function based on a requirement, and may perform sensing at any time based on the requirement without depending on the reference signal used when data is sent. Therefore, sensing time is more flexible, and sensing performance is improved. In a scenario in which there is a control node, before S301, the control node may send a trigger signal to the first communication apparatus, and the first communication apparatus receives the trigger signal from the control node. The trigger signal indicates the first communication apparatus to enable the sensing function, and the first communication apparatus enables the sensing function based on the trigger signal.

Based on the descriptions of the foregoing embodiments, the following further describes in detail the reference signal-based sensing method provided in embodiments of this application with reference to a specific application scenario.

Figure 10:
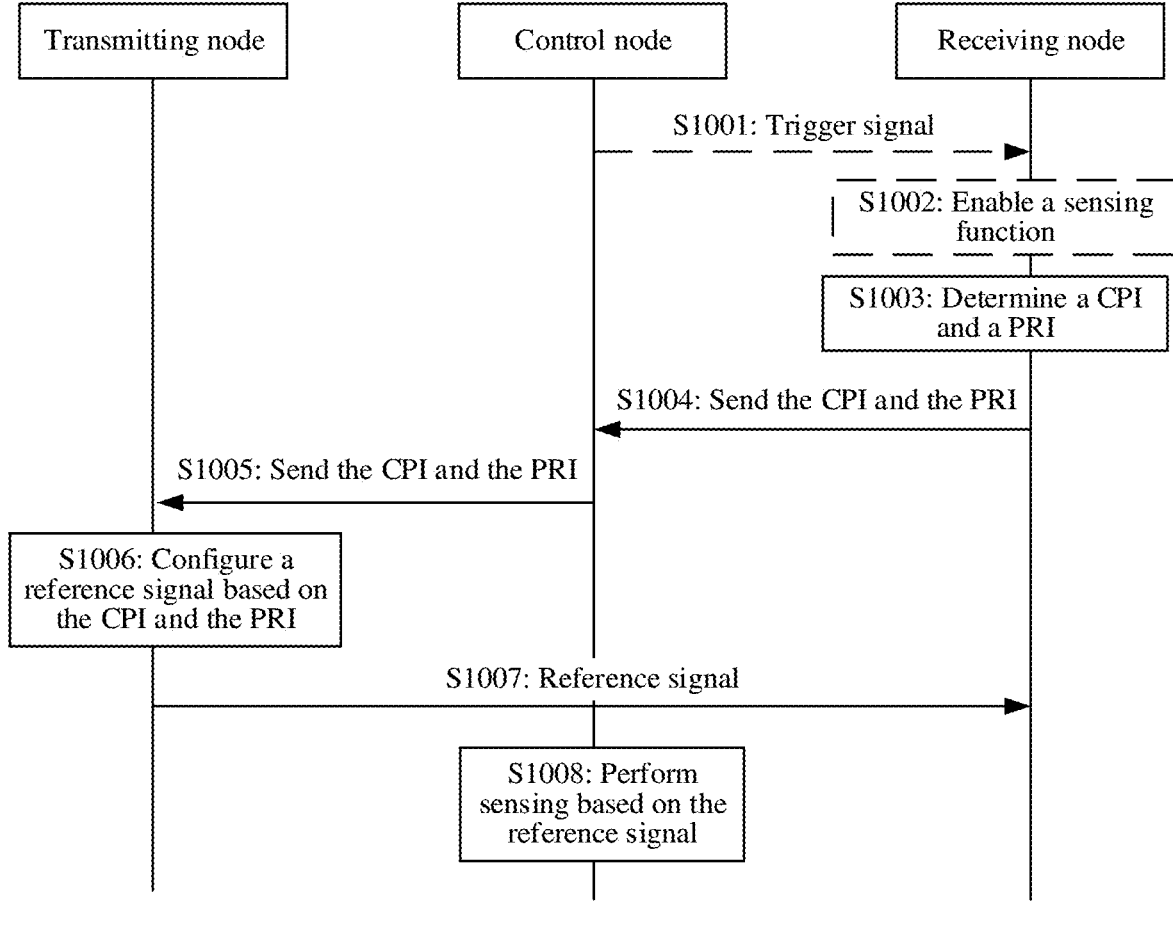
FIG. 10 is a schematic flowchart of a reference signal-based sensing method in a scenario in which a control node exists according to an embodiment of this application.

From perspectives of sending and receiving a reference signal, it is assumed that a first communication apparatus is described as a receiving node, a second communication apparatus is described as a transmitting node, and first information indicates a PRI and a CPI. In a scenario in which there is a control node, as shown in FIG. 10, a procedure of a reference signal-based sensing method is described as follows.

S1001: The control node sends a trigger signal to the receiving node, where the trigger signal indicates the receiving node to enable a sensing function. Correspondingly, the receiving node receives the trigger signal from the control node.

S1002: The receiving node enables the sensing function based on the trigger signal.

A type of the trigger signal may be RRC signaling, or may be DCI.

S1001 and S1002 are optional steps.

S1003: The receiving node determines the CPI and the PRI.

This step corresponds to S301. The receiving node determines the CPI and the PRI. For details, refer to related descriptions that the first communication apparatus determines the first information and the first information indicates the PRI and the CPI in the embodiment in FIG. 3.

S1004: The receiving node sends the CPI and the PRI to the control node. Correspondingly, the control node receives the CPI and the PRI from the receiving node.

S1005: The control node forwards the CPI and the PRI to the transmitting node, and the transmitting node receives the CPI and the PRI from the control node.

The receiving node may send the CPI and the PRI and the control node may forward the CPI and the PRI in a form of the first information. For various possible implementations of steps S1004 and S1005, refer to related descriptions in the scenario (for example, the scenario 4, 5, or 6) in which the first communication apparatus sends the first information to the second communication apparatus, the first information indicates the PRI and the CPI, and there is the control node in the embodiment in FIG. 3. Details are not described herein again.

S1006: The transmitting node determines, based on information about the CPI, that a length of a continuously sent reference signal is not less than a length of one CPI, and determines, based on information about the PRI, that a periodicity of the reference signal in time domain is less than or equal to a length of one PRI. In this way, the transmitting node configures the reference signal based on the CPI and the PRI.

S1007: The transmitting node transmits the configured reference signal through an air interface, and the receiving node receives the reference signal.

For various possible implementations of steps S1006 and S1007, refer to related descriptions used when the second communication apparatus sends the reference signal to the first communication apparatus based on the first information and the first information indicates the PRI and the CPI in the embodiment in FIG. 3. Details are not described herein again.

S1008: The receiving node senses a to-be-sensed target based on the reference signal.

This step corresponds to S304. For details, refer to related descriptions that the first communication apparatus senses the to-be-sensed target based on the reference signal in the embodiment in FIG. 3.

In a sensing technology, a sensing signal may be used to sense a to-be-sensed target. A transmitting node and a receiving node of the sensing signal are a same device, for example, may be referred to as a sensing device. A transmitter of the sensing device sends the sensing signal, and the sensing signal is received by a receiver of the sensing device through a wireless channel. The sensing signal is a specific waveform signal. The signal is processed with reference to a transmitted signal and a received signal, so that a to-be-sensed target in the wireless channel can be extracted, and a result of sensing can be obtained. In embodiments of this application, the sensing device may determine a PRI. For a method for determining the PRI by the sensing device, refer to related descriptions of the foregoing method for determining the PRI by the first communication apparatus. Meanings and functions of the PRIs are the same or similar. The sensing device sends the sensing signal based on the PRI. For example, a periodicity of the sensing signal sent by the sensing device in time domain is less than or equal to the PRI. Alternatively, the sensing device may further determine a CPI. For a method for determining the CPI by the sensing device, refer to related descriptions of the foregoing method for determining the CPI by the first communication apparatus. Meanings and functions of the CPIs are the same or similar. The sensing device sends the sensing signal based on the CPI. For example, a length of the sensing signal sent by the sensing device is greater than or equal to a length of the CPI. Alternatively, the sensing device may determine a PRI and a CPI, and the sensing device sends the sensing signal based on the PRI and the CPI. For example, a length of the sensing signal sent by the sensing device is greater than or equal to a length of the CPI, and a periodicity of the sensing signal sent by the sensing device in time domain is less than or equal to the PRI. A condition that the sense signal meets is the same as or similar to a condition that the reference signal meets in the foregoing descriptions.

To implement functions in the method provided in the foregoing embodiments of this application, the network device or the terminal device may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 11:
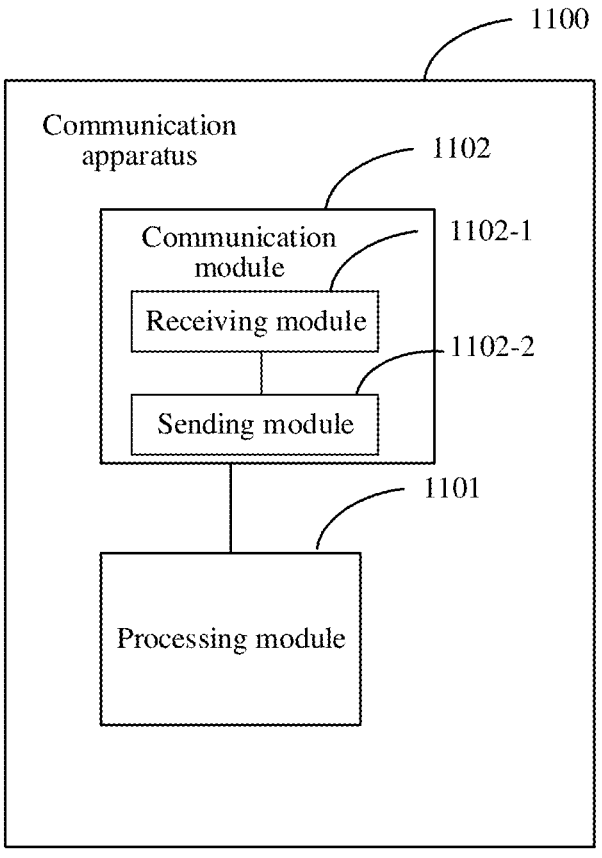
FIG. 11 is a first schematic diagram of a structure of a communication apparatus according to an embodiment of this application.

As shown in FIG. 11, based on a same technical concept, an embodiment of this application further provides a communication apparatus 1100. The communication apparatus 1100 may be a first communication apparatus or a second communication apparatus, an apparatus in the first communication apparatus or the second communication apparatus, or an apparatus that can be used with the first communication apparatus or the second communication apparatus. In a design, the communication apparatus 1100 may include modules that are in a one-to-one correspondence with the methods/operations/steps/actions performed by the first communication apparatus or the second communication apparatus in the foregoing method embodiments. The modules may be implemented by a hardware circuit, software, or a combination of a hardware circuit and software. In a design, the communication apparatus may include a processing module 1101 and a communication module 1102. The processing module 1101 is configured to invoke the communication module 1102 to perform a receiving function and/or a sending function. Further, the communication module 1102 may also be referred to as a transceiver module, and may include a receiving module 1102-1 and a sending module 1102-2. The receiving module is configured to perform a receiving operation in the method embodiments, and the sending module is configured to perform a sending operation in the method embodiments. In this embodiment of this application, that the processing module performs a sending or receiving operation through the communication module may be understood as follows: The processing module delivers an instruction to the communication module, and the communication module performs the sending or receiving operation, or the processing module indicates the communication module to perform the sending or receiving operation.

When the communication apparatus is configured to perform the method performed by the first communication apparatus, the processing module 1101 is configured to determine first information, where the first information indicates a pulse repetition interval PRI;

the sending module 1102-2 is configured to send the first information to a second communication apparatus, where the first information is used by the second communication apparatus to send a reference signal, and a periodicity of the reference signal in time domain is less than or equal to the PRI;

the receiving module 1102-1 is configured to receive the reference signal from the second communication apparatus; and the processing module 1101 is configured to sense a to-be-sensed target based on the reference signal.

The receiving module 1102-1 is further configured to perform another receiving step or operation performed by the first communication apparatus in the foregoing method embodiments. The sending module 1102-2 is further configured to perform another sending step or operation performed by the first communication apparatus in the foregoing method embodiments. The processing module 1101 may be further configured to perform other corresponding steps or operations performed by the first communication apparatus in the foregoing method embodiments than sending and receiving. Details are not described herein again.

When the communication apparatus is configured to perform the method performed by the second communication apparatus, the receiving module 1102-1 is configured to receive first information from a first communication apparatus, where the first information indicates a pulse repetition interval PRI; and the sending module 1102-2 is configured to send a reference signal based on the first information, where the reference signal is used by the first communication apparatus to sense a to-be-sensed target, and a periodicity of the reference signal in time domain is less than or equal to the PRI.

The receiving module 1102-1 is further configured to perform another receiving step or operation performed by the second communication apparatus in the foregoing method embodiments. The sending module 1102-2 is further configured to perform another sending step or operation performed by the second communication apparatus in the foregoing method embodiments. The processing module 1101 may be further configured to perform other corresponding steps or operations performed by the second communication apparatus in the foregoing method embodiments than sending and receiving. Details are not described herein again.

In this embodiment of this application, the module division is an example, and is merely logical function division and may be another division manner during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

Figure 12:
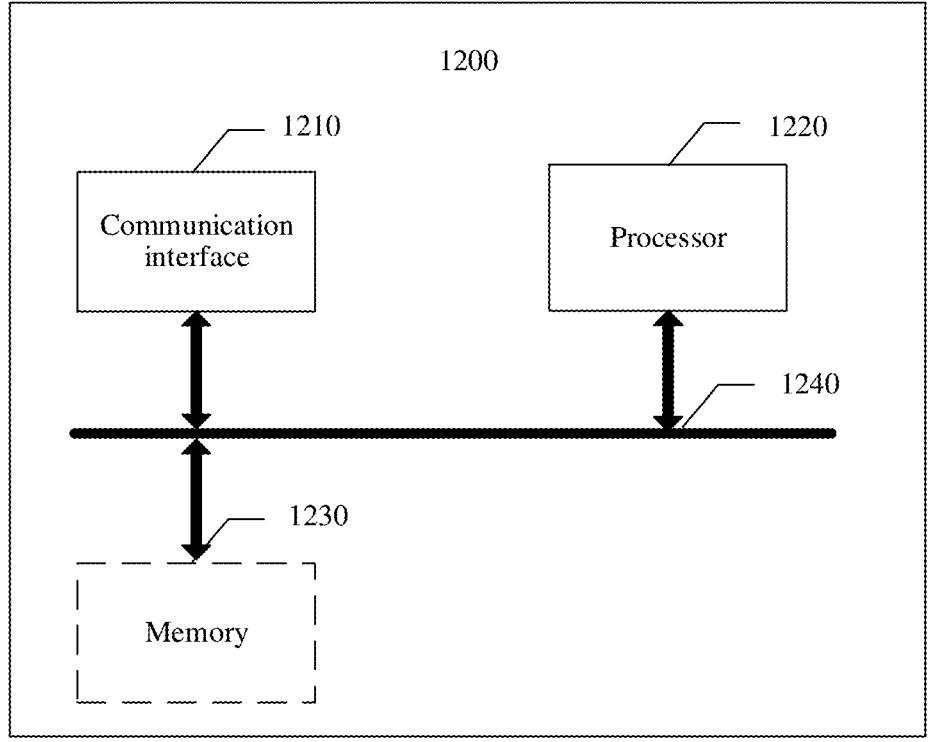
FIG. 12 is a second schematic diagram of a structure of a communication apparatus according to an embodiment of this application.

FIG. 12 shows a communication apparatus 1200 according to an embodiment of this application. The communication apparatus 1200 is configured to implement functions of the terminal device or the network device in the foregoing methods. When implementing functions of the network device, the communication apparatus may be a network device, an apparatus in the network device, or an apparatus that can be used with the network device. When implementing functions of the terminal device, the communication apparatus may be a terminal device, an apparatus in the terminal device, or an apparatus that can be used with the terminal device. The communication apparatus may be a chip system. In this embodiment of this application, the chip system may include a chip, or may include a chip and another discrete device. The communication apparatus 1200 includes at least one processor 1220, configured to implement functions of the terminal device or the network device in the methods provided in embodiments of this application. The communication apparatus 1200 may further include a communication interface 1210. In this embodiment of this application, the communication interface may be a transceiver, a circuit, a bus, a module, or another type of communication interface, and is configured to communicate with another device through a transmission medium. The transceiver may include a receiver and a transmitter. The receiver is configured to implement a receiving operation, and the transmitter is configured to implement a sending operation. When the communication apparatus is the chip system, the communication interface 1210 may include an input interface and an output interface. The input interface correspondingly performs a receiving operation, and the output interface correspondingly performs a sending operation. For example, the communication interface 1210 is used by an apparatus in the apparatus 1200 to communicate with another device. For example, when the communication apparatus 1200 is the first communication apparatus, the another device may be the second communication apparatus. When the communication apparatus 1200 is the second communication apparatus, the another apparatus may be the first communication apparatus. The processor 1220 receives and sends data through the communication interface 1210, and is configured to implement the methods described in the foregoing method embodiments. For example, when functions of the first communication apparatus are implemented, the communication interface 1210 is configured to send first information to a second communication apparatus, where the first information is used by the second communication apparatus to send a reference signal, and a periodicity of the reference signal in time domain is less than or equal to a PRI; the communication interface 1210 is further configured to receive the reference signal from the second communication apparatus; and the processor 1220 is configured to sense a to-be-sensed target based on the reference signal.

The communication interface 1210 is further configured to perform another receiving or sending step or operation performed by the first communication apparatus in the foregoing method embodiments. The processor 1220 may be further configured to perform other corresponding steps or operations performed by the first communication apparatus in the foregoing method embodiments than sending and receiving. Details are not described herein again.

When the communication apparatus is configured to perform the method performed by the second communication apparatus, the communication interface 1210 is configured to receive first information from a first communication apparatus, where the first information indicates a pulse repetition interval PRI; and the communication interface 1210 is further configured to send a reference signal based on the first information, where the reference signal is used by the first communication apparatus to sense a to-be-sensed target, and a periodicity of the reference signal in time domain is less than or equal to the PRI.

The communication interface 1210 is further configured to perform another receiving or sending step or operation performed by the second communication apparatus in the foregoing method embodiments. The processor 1220 may be further configured to perform other corresponding steps or operations performed by the second communication apparatus in the foregoing method embodiments than sending and receiving. Details are not described herein again.

The communication apparatus 1200 may further include at least one memory 1230, configured to store program instructions and/or data. The memory 1230 is coupled to the processor 1220. The coupling in this embodiment of this application may be an indirect coupling or a communication connection between apparatuses, units, or modules in an electrical form, a mechanical form, or another form, and is used for information exchange between the apparatuses, the units, or the modules. The processor 1220 may cooperate with the memory 1230. The processor 1220 may execute the program instructions stored in the memory 1230. At least one of the at least one memory may be included in the processor.

A specific connection medium between the communication interface 1210, the processor 1220, and the memory 1230 is not limited in this embodiment of this application. In this embodiment of this application, the memory 1230, the processor 1220, and the communication interface 1210 are connected through a bus 1240 in FIG. 12. The bus is represented by a bold line in FIG. 12. A manner of a connection between other components is merely an example for description, and is not limited. The bus may be classified into an address bus, a data bus, a control bus, and the like. For ease of representation, only one bold line indicates the bus in FIG. 12, but this does not mean that there is only one bus or only one type of bus.

When the communication apparatus 1100 and the communication apparatus 1200 are chips or chip systems, the communication module 1102 and the communication interface 1210 may output or receive baseband signals. When the communication apparatus 1100 and the communication apparatus 1200 are devices, the communication module 1102 and the communication interface 1210 may output or receive radio frequency signals. In this embodiment of this application, the processor may be a general-purpose processor, a digital signal processor, an application-specific integrated circuit, a logic circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor, any conventional processor, or the like. The steps of the methods disclosed with reference to embodiments of this application may be directly implemented by a hardware processor, or may be implemented by using a combination of hardware in a processor and a software module.

In this embodiment of this application, the memory 1230 may be a non-volatile memory, for example, a hard disk drive (HDD) or a solid-state drive (SSD), or may be a volatile memory, for example, a random-access memory (RAM). The memory is any other medium that can carry or store expected program code in a form of an instruction structure or a data structure and that can be accessed by a computer, but is not limited thereto. The memory in this embodiment of this application may alternatively be a circuit or any other apparatus that can implement a storage function, and is configured to store program instructions and/or data.

Some or all of the operations and functions performed by the first communication apparatus described in the foregoing method embodiments of this application, or some or all of the operations and functions performed by the second communication apparatus may be completed by using a chip or an integrated circuit.

To implement functions of the communication apparatus in FIG. 11 or FIG. 12, an embodiment of this application further provides a chip, including a processor, configured to support the communication apparatus in implementing functions of the first communication apparatus or the second communication apparatus in the foregoing method embodiments. In a possible design, the chip is connected to a memory or the chip includes the memory, and the memory is configured to store program instructions and data that are for the communication apparatus.

An embodiment of this application provides a computer-readable storage medium storing a computer program. The computer program includes instructions used to perform the foregoing method embodiments.

An embodiment of this application provides a computer program product including instructions. When the computer program product runs on a computer, the foregoing method embodiments are implemented.

An embodiment of this application provides a computer program. When the computer program is run on a computer, the foregoing method embodiments are implemented.

Persons skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can instruct the computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more processes in the flowcharts and/or in one or more blocks in the block diagrams.

Although some embodiments of this application have been described, persons skilled in the art can make changes and modifications to these embodiments once they learn of the basic inventive concept. Therefore, the following claims are intended to be construed as to cover the embodiments and all changes and modifications falling within the scope of this application.

Clearly, persons skilled in the art can make various modifications and variations to embodiments of this application without departing from the scope of embodiments of this application. In this case, this application is intended to cover these modifications and variations of embodiments of this application provided that they fall within the scope of protection defined by the following claims and their equivalent technologies.

What is claimed is:

1. A sensing method, comprising:
determining, by a first communication apparatus, first information, wherein the first information indicates a pulse repetition interval (PRI);
sending, by the first communication apparatus, the first information to a second communication apparatus, wherein the first information is used by the second communication apparatus to send a reference signal, and a periodicity of the reference signal in time domain is less than or equal to the PRI;
receiving, by the first communication apparatus, the reference signal from the second communication apparatus; and
sensing, by the first communication apparatus, a to-be-sensed target based on the reference signal.

2. The sensing method according to claim 1, further comprising:
sending, by the first communication apparatus, a result of sensing the to-be-sensed target to the second communication apparatus, wherein the result of sensing the to-be-sensed target is used by the second communication apparatus to configure a density of the reference signal in time domain.

3. The sensing method according to claim 1, wherein the PRI is determined based on a maximum movement speed of the to-be-sensed target and a wavelength of the reference signal.

4. The sensing method according to claim 3, wherein the PRI conforms to the following relational expression:
the PRI is less than or equal to $\lambda/V_{max}$,
wherein $\lambda$ is the wavelength of the reference signal, and $V_{max}$ is the maximum movement speed of the to-be-sensed target.

5. The sensing method according to claim 1, wherein the first information further indicates a coherent processing interval (CPI), and a length of the reference signal is greater than or equal to a length of the CPI.

6. The sensing method according to claim 5, wherein the CPI is determined based on one or more of a relative movement speed between the first communication apparatus and the to-be-sensed target, a range resolution unit, relative movement acceleration between the first communication apparatus and the to-be-sensed target, or a speed resolution unit.

7. The sensing method according to claim 6, wherein the CPI conforms to the following relational expression:
the CPI is less than or equal to $\Delta R/v$,
wherein $\Delta R$ is the range resolution unit, and v is the relative movement speed between the first communication apparatus and the to-be-sensed target.

8. The sensing method according to claim 7, wherein the CPI conforms to the following relational expression:
the CPI is less than or equal to $\Delta v/a$,
wherein $\Delta v$ is the speed resolution unit, and a is the relative movement acceleration between the first communication apparatus and the to-be-sensed target.

9. A sensing method, comprising:
receiving, by a second communication apparatus, first information from a first communication apparatus, wherein the first information indicates a pulse repetition interval PRI;
interval (PRI); and
sending, by the second communication apparatus, a reference signal based on the first information, wherein the reference signal is used by the first communication apparatus to sense a to-be-sensed target, and a periodicity of the reference signal in time domain is less than or equal to the PRI.

10. The sensing method according to claim 9, further comprising:
receiving, by the second communication apparatus, a result of sensing the to-be-sensed target from the first communication apparatus; and
configuring, by the second communication apparatus, a density of the reference signal in time domain based on the result of sensing the to-be-sensed target.

11. The sensing method according to claim 9, wherein the PRI is determined based on a maximum movement speed of the to-be-sensed target and a wavelength of the reference signal.

12. The sensing method according to claim 11, wherein the PRI conforms to the following relational expression:
the PRI is less than or equal to $\lambda/V_{max}$,
wherein $\lambda$ is the wavelength of the reference signal, and $V_{max}$ is the maximum movement speed of the to-be-sensed target.

13. The sensing method according to claim 9, wherein the first information further indicates a coherent processing interval (CPI), and a length of the reference signal is greater than or equal to a length of the CPI.

14. A communication apparatus, comprising: a processor; and
a memory having instructions stored thereon that, when executed by the processor, cause the communication apparatus to:
determine first information, wherein the first information indicates a pulse repetition interval PRI; interval (PRI);
send the first information to a second communication apparatus, wherein the first information is used by the second communication apparatus to send a reference signal, and a periodicity of the reference signal in time domain is less than or equal to the PRI;
receive the reference signal from the second communication apparatus; and
sense a to-be-sensed target based on the reference signal.

15. The communication apparatus according to claim 14, wherein the communication apparatus is further caused to:
send a result of sensing the to-be-sensed target to the second communication apparatus, wherein the result of sensing the to-be-sensed target is used by the second communication apparatus to configure a density of the reference signal in time domain.

16. The communication apparatus according to claim 14, wherein the PRI is determined based on a maximum movement speed of the to-be-sensed target and a wavelength of the reference signal.

17. The communication apparatus according to claim 16, wherein the PRI conforms to the following relational expression:

the PRI is less than or equal to $\lambda/V_{max}$, wherein $\lambda$ is the wavelength of the reference signal, and $V_{max}$ is the maximum movement speed of the to-be-sensed target.

18. The communication apparatus according to claim 14, wherein the first information further indicates a coherent processing interval (CPI), and a length of the reference signal is greater than or equal to a length of the CPI.

19. The communication apparatus according to claim 18, wherein the CPI is determined based on one or more of a relative movement speed between the communication apparatus and the to-be-sensed target, a range resolution unit, relative movement acceleration between the first communication apparatus and the to-be-sensed target, or a speed resolution unit.

20. The communication apparatus according to claim 19, wherein the CPI conforms to at least one of the following relational expression:

the CPI is less than or equal to $\Delta R/v$, or the CPI is less than or equal to $\Delta v/a$, wherein $\Delta R$ is the range resolution unit, and v is the relative movement speed between the first communication apparatus and the to-be-sensed target; wherein $\Delta v$ is the speed resolution unit, and a is the relative movement acceleration between the first communication apparatus and the to-be-sensed target.

* * * * *